(12) United States Patent
Kaneko et al.

(10) Patent No.: US 11,288,851 B2
(45) Date of Patent: Mar. 29, 2022

(54) SIGNAL CHANGE APPARATUS, METHOD, AND PROGRAM

(71) Applicant: NIPPON TELEGRAPH AND TELEPHONE CORPORATION, Tokyo (JP)

(72) Inventors: Takuhiro Kaneko, Atsugi (JP); Kaoru Hiramatsu, Atsugi (JP); Kunio Kashino, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 28 days.

(21) Appl. No.: 16/609,898

(22) PCT Filed: May 1, 2018

(86) PCT No.: PCT/JP2018/017404
§ 371 (c)(1),
(2) Date: Oct. 31, 2019

(87) PCT Pub. No.: WO2018/203549
PCT Pub. Date: Nov. 8, 2018

(65) Prior Publication Data
US 2020/0193661 A1    Jun. 18, 2020

(30) Foreign Application Priority Data
May 2, 2017    (JP) .............................. JP2017-091733

(51) Int. Cl.
*G06T 11/60*    (2006.01)
*G06F 3/0485*    (2013.01)
(Continued)

(52) U.S. Cl.
CPC .......... *G06T 11/60* (2013.01); *G06F 3/04855* (2013.01); *G06N 3/08* (2013.01); *G06T 11/40* (2013.01)

(58) Field of Classification Search
CPC .......... G06T 11/60; G06T 11/40; G06T 11/00; G06F 3/04855; G06N 3/08; G06N 3/0472; G06N 3/0454
(Continued)

(56) References Cited

U.S. PATENT DOCUMENTS

| 2004/0170337 A1* | 9/2004 | Simon | G06T 11/00 |
| | | | 382/254 |
| 2005/0174449 A1* | 8/2005 | Matsuzaka | H04N 1/56 |
| | | | 348/240.3 |

(Continued)

FOREIGN PATENT DOCUMENTS

| JP | 2003022451 A | 1/2003 |
| JP | 2010534376 A | 11/2010 |

(Continued)

OTHER PUBLICATIONS

Liu, Luoqi et al. "Wow! You Are so Beautiful Today!", ACMMM 2013.

(Continued)

*Primary Examiner* — Jennifer Mehmood
*Assistant Examiner* — Kim Thanh T Tran
(74) *Attorney, Agent, or Firm* — Harness, Dickey & Pierce, P.L.C.

(57) ABSTRACT

A signal output unit outputs an acquired signal. A signal attribute value display unit displays a value of an attribute related to an element constituting a target represented by the acquired signal or a signal generation source in a state in which a change instruction of the value of the attribute is able to be received. A changed attribute value acquisition unit acquires a changed value of the attribute when the change instruction of the value of the attribute is received. A change unit changes the value of the attribute for which the change instruction has been received on the basis of the (Continued)

changed value of the attribute acquired by the changed attribute value acquisition unit. A changed signal output unit outputs a changed signal in which the value of the attribute has been changed.

11 Claims, 13 Drawing Sheets

(51) Int. Cl.
   *G06N 3/08* (2006.01)
   *G06T 11/40* (2006.01)
   *G06F 3/04855* (2022.01)
(58) Field of Classification Search
   USPC .......................................................... 345/629
   See application file for complete search history.

(56) References Cited

U.S. PATENT DOCUMENTS

| | | | |
|---|---|---|---|
| 2006/0217826 A1* | 9/2006 | Matsuya | H04N 1/2166 700/90 |
| 2009/0028380 A1 | 1/2009 | Hillebrand et al. | |
| 2015/0339757 A1 | 11/2015 | Aarabi | |
| 2017/0076714 A1* | 3/2017 | Mori | G10L 13/033 |

FOREIGN PATENT DOCUMENTS

| JP | 2016042659 A | 3/2016 |
|---|---|---|
| JP | 2016194892 A | 11/2016 |

OTHER PUBLICATIONS

Yan, Xinchen et al., "Attribute2Image: Conditional Image Generation from Visual Attributes", arXiv 2015.

Larsen, Anders Boesen Lindbo et al. "Autoencoding beyond pixels using a learned similarity metric", ICML 2016.

Chen, Xi et al., "InfoGAN:Interpretable Representation Learning by Information Maximizing Generative Adversarial Nets", [online], Jun. 12, 2016, pp. 1-9, [retrieval date Jul. 4, 2018], internet:<URL:https://arxiv.org/abs/1606.03657>.

International Search Report regarding PCT/JP2018/017404, dated Jul. 17, 2018. ISA/JP.

Nikkei Business Publications, Inc., "Road maps, Artifical intelligence, road maps to super-human", Nikkei Electronics No. 1168, Japan, 2016.

Japanese Office Action regarding counterpart JP2021004529, dated Jan. 25, 2022.

* cited by examiner

SIGNAL CHANGE APPARATUS, METHOD, AND PROGRAM

CROSS-REFERENCE TO RELATED APPLICATIONS

This application is a 371 U.S. National Phase of International Application No. PCT/JP2018/017404, filed on May 1, 2018, which claims priority to Japanese Application No. 2017-091733, filed May 2, 2017. The entire disclosures of the above applications are incorporated herein by reference.

TECHNICAL FIELD

The present invention relates to a signal change apparatus, method, and program for changing a signal.

BACKGROUND ART

Conventionally, a method for directly editing an image is known (Non-Patent Document 1).

Moreover, a method for representing attributes of an image as a one-dimensional vector (cVAE: conditional variational auto-encoder) and editing the image is also known (Non-Patent Document 2).

Moreover, a method for calculating an attribute vector as follows and attaching the calculated attribute vector to a target image is known (Non-Patent Document 3).

> (Attribute vector)=(Average of latent variables of image including given attribute)−(Average of latent variables of image that does not include given attribute)

It is to be noted that a latent variable is like an essence useful for representing an image.

PRIOR ART DOCUMENTS

Non-Patent Documents

Non-Patent Document 1: L. Liu, et al., "Wow! You Are So Beautiful Today!", ACMMM 2013.
Non-Patent Document 2: X. Yan, et al., "Attribute2Image: Conditional Image Generation from Visual Attributes", arXiv 2015.
Non-Patent Document 3: A. B. L. Larsen, et al., "Autoencoding beyond pixels using a learned similarity metric", ICML 2016.

SUMMARY OF INVENTION

Problems to be Solved by the Invention

With the method described in the Non-Patent Document 1, it is difficult to cope with various types of input data because of strong constraints such as a face facing in front, short hair/bundled hair, and thin makeup/no makeup.

Moreover, with the method described in the Non-Patent Document 2, expressiveness is insufficient because the attributes are one-dimensionally represented.

Moreover, with the method described in the Non-Patent Document 3, it is difficult to edit the image because identity and an attribute within the latent variables extracted from the image are not separated.

The present invention has been made in consideration of the above-described circumstances and an object of the present invention is to provide a signal change apparatus, method, and program capable of appropriately changing a signal such as an image.

Means for Solving the Problems

In order to achieve the above-described object, a signal change apparatus according to a first aspect of the present invention includes: a signal output unit that outputs an acquired signal; a signal attribute value display unit that displays a value of an attribute related to an element constituting a target represented by the acquired signal or a signal generation source in a state in which a change instruction of the value of the attribute is able to be received; a changed attribute value acquisition unit that acquires a changed value of the attribute when the change instruction of the value of the attribute is received; a change unit that changes the value of the attribute for which the change instruction has been received on the basis of the changed value of the attribute acquired by the changed attribute value acquisition unit; and a changed signal output unit that outputs a changed signal in which the value of the attribute has been changed.

A signal change method according to a second aspect of the present invention includes: outputting, by a signal output unit, an acquired signal; displaying, by a signal attribute value display unit, a value of an attribute related to an element constituting a target represented by the acquired signal or a signal generation source in a state in which a change instruction of the value of the attribute is able be received; acquiring, by a changed attribute value acquisition unit, a changed value of the attribute when the change instruction of the value of the attribute is received; changing, by a change unit, the value of the attribute for which the change instruction has been received on the basis of the changed value of the attribute acquired by the changed attribute value acquisition unit; and outputting, by a changed signal output unit, a changed signal in which the value of the attribute has been changed.

According to the first and second aspects, a value of an attribute related to an element constituting a target represented by an acquired signal or a signal generation source is displayed in a state in which an instruction for changing the value of the attribute is able to be received, the value of the attribute for which the change instruction has been received is changed on the basis of the changed value of the attribute when the instruction for changing the value of the attribute is received, and a changed signal in which the value of the attribute has been changed is output. Thereby, it is possible to appropriately change a signal.

In the signal change apparatus according to the first aspect, each of the acquired signal and the changed signal may be an image, and the attribute may be an attribute related to an element constituting a subject representing the image.

In the signal change apparatus according to the first aspect, the signal attribute value display unit may display the value of the attribute by means of a controller indicating the value of the attribute in the state in which the change instruction of the value of the attribute is able to be received.

A signal change apparatus according to a third aspect of the present invention includes: a variable extraction unit that extracts a latent variable of an input signal; a change unit that changes a value of the latent variable extracted by the variable extraction unit; and a signal generation unit that generates a signal from the latent variable changed by the change unit.

A signal change method according to a fourth aspect of the present invention includes: extracting, by a variable extraction unit, a latent variable of an input signal; changing, by a change unit, a value of the latent variable extracted by the variable extraction unit; and generating, by a signal generation unit, a signal from the latent variable changed by the change unit.

According to the third and fourth aspects, a latent variable of an input signal is extracted, a value of the extracted latent variable is changed, and a signal is generated from the changed latent variable. Thereby, it is possible to appropriately change a signal.

In the signal change apparatus according to the third aspect, the variable extraction unit may extract latent variables from the input signal using a pre-learned first neural network, the extracted latent variables including a plurality of latent variables representing an attribute, the change unit may change a conversion result of a change target within conversion results obtained by converting the plurality of latent variables representing the attribute or a latent variable of a change target within latent variables other than the plurality of latent variables representing the attribute among the extracted latent variables using a value of an attribute vector representing the attribute in the input signal, and the signal generation unit may generate the signal from the conversion result of the change target or a conversion result obtained by the change unit changing the latent variable of the change target and the latent variables other than the plurality of latent variables using a pre-learned second neural network.

A signal change apparatus according to a fifth aspect of the present invention includes: a variable extraction unit that extracts a latent variable representing an attribute of an input signal; a change unit that changes a value of the latent variable extracted by the variable extraction unit by replacing the value of the extracted latent variable with a value of a latent variable representing an attribute extracted from a signal of a transfer source; and a signal generation unit that generates a signal from the latent variable changed by the change unit.

A signal change method according to a sixth aspect of the present invention includes: extracting, by a variable extraction unit, a latent variable representing an attribute of an input signal; changing, by a change unit, a value of the latent variable extracted by the variable extraction unit by replacing the value of the extracted latent variable with a value of a latent variable representing an attribute extracted from a signal of a transfer source; and generating, by a signal generation unit, a signal from the latent variable changed by the change unit.

According to the fifth and sixth aspects, a latent variable representing an attribute of an input signal is extracted, a value of the extracted latent variable is changed by replacing the value of the extracted latent variable with a value of a latent variable representing an attribute extracted from a signal of a transfer source, and a signal is generated from the changed latent variable. Thereby, it is possible to appropriately change a signal.

A program according to a seventh aspect of the present invention causes a computer to function as each unit constituting the signal change apparatus.

Advantageous Effects of Invention

According to a signal change apparatus, method, and program of the present invention, an advantageous effect that it is possible to appropriately change a signal can be obtained.

MODES FOR CARRYING OUT THE INVENTION

Hereinafter, embodiments of the present invention will be described in detail with reference to the drawings.

Overview of First Embodiment of Present Invention

First, an overview of the first embodiment of the present invention will be described.

Figure 1:
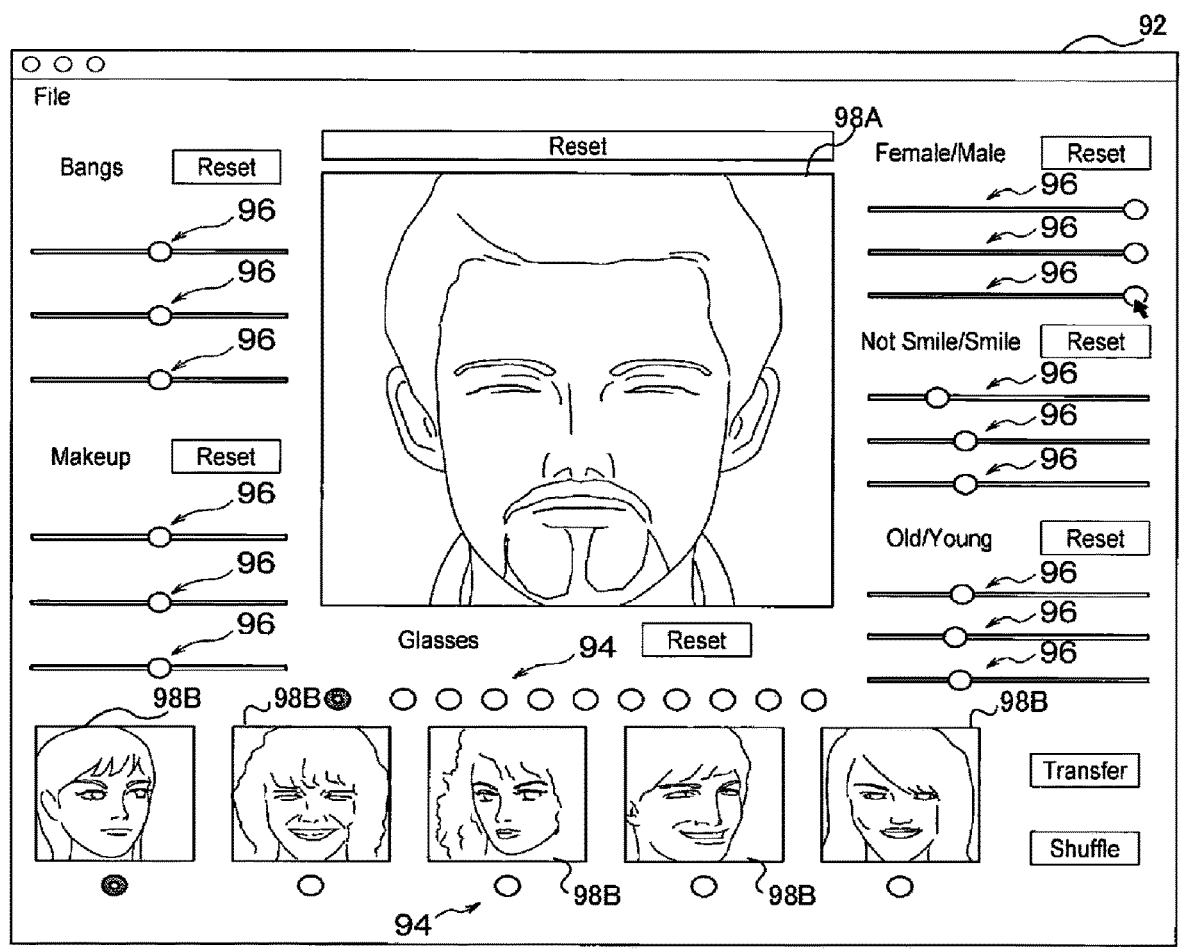
FIG. 1 is an imaginary diagram of an attribute change screen in a first embodiment of the present invention.

In the first embodiment, as shown in FIG. 1, it is possible to freely control an attribute by moving a slide bar 96 corresponding to the value of the attribute or clicking a radio button 94 corresponding to the value of the attribute and change an image as in conventional image editing software.

Here, various data exists in society. For example, there are images corresponding to various face orientations, images corresponding to various illumination conditions, images corresponding to various ages, and images corresponding to various facial expressions.

Figure 2:
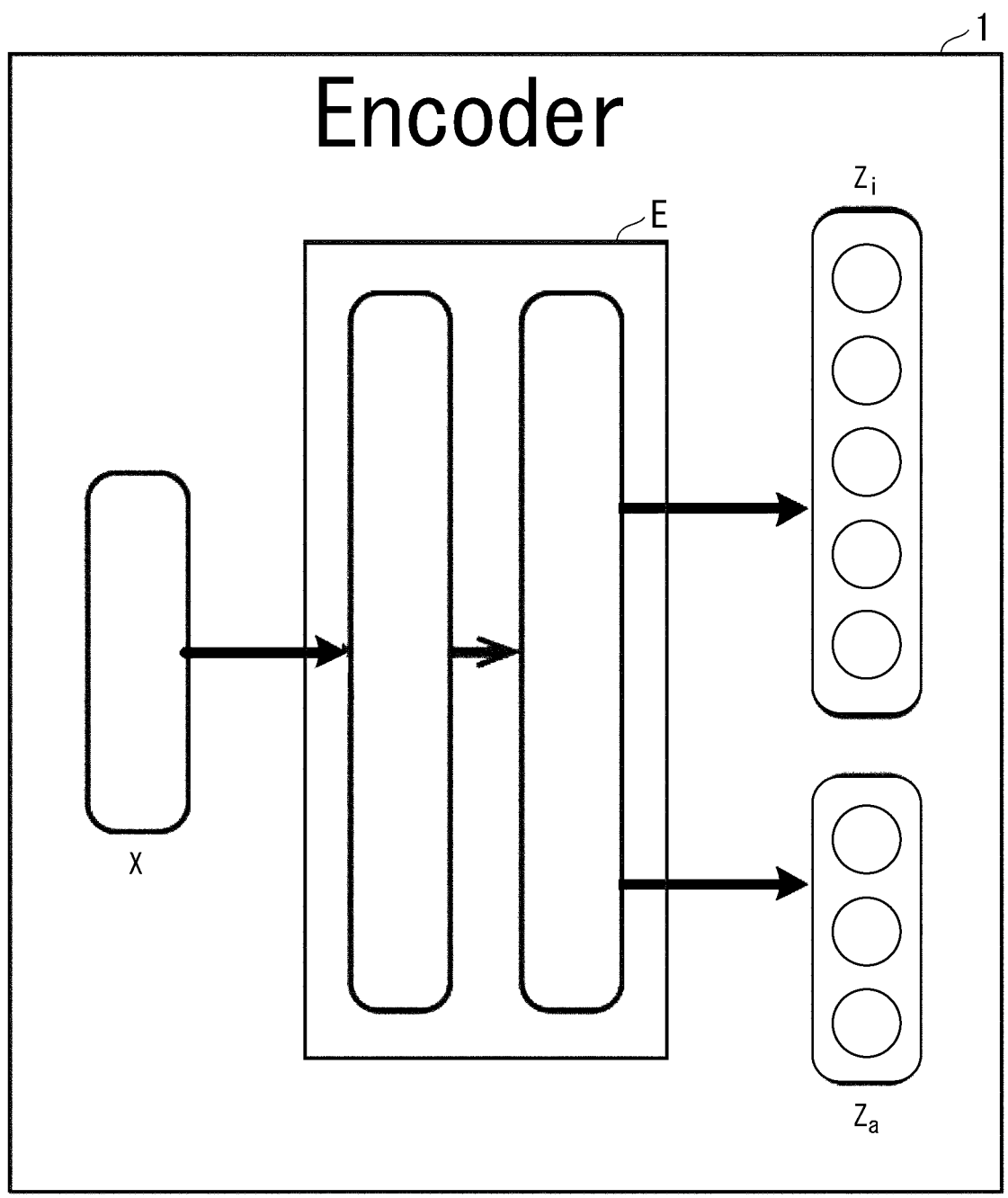
FIG. 2 is a conceptual diagram of an encoder in the first embodiment of the present invention.

Therefore, in the present embodiment, latent variables (like an essence useful for representing an image) are extracted using a neural network E as shown in FIG. 2 and the value of a latent variable is changed, rather than directly editing an image.

Moreover, diversity is present even in one attribute. For example, even "bangs" have a variety of shapes.

Figure 3:
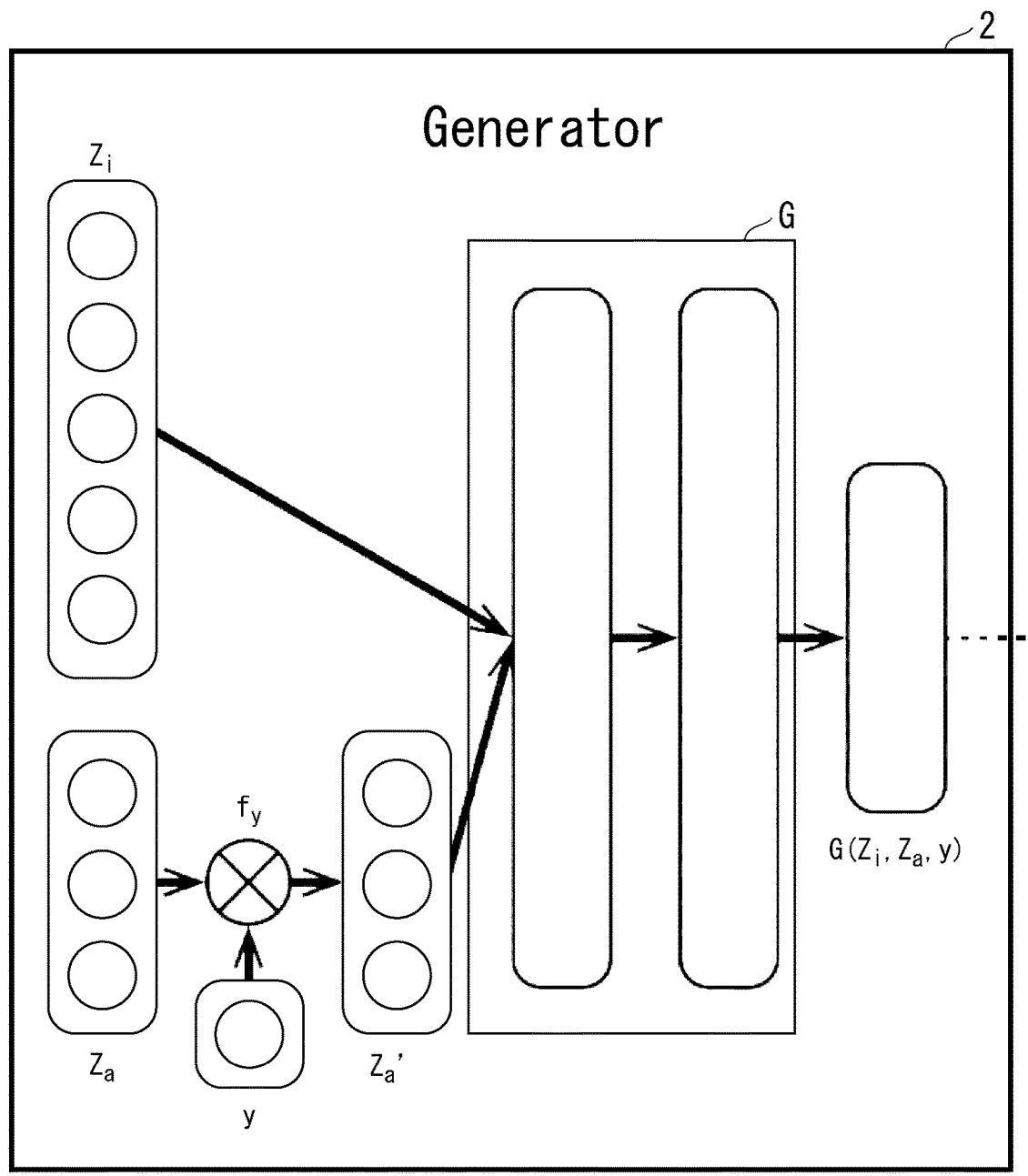
FIG. 3 is a conceptual diagram of a generator in the first embodiment of the present invention.

Therefore, in the present embodiment, for each of attributes, each attribute is represented by a plurality of latent variables, as shown in FIG. 3. Specifically, an attribute can be controlled easily by separating the plurality of latent variables into latent variables representing identity and latent variables representing the attribute. Sufficient expressiveness can be obtained by representing each attribute using a plurality of latent variables on an attribute-by-attribute basis. When an attribute is represented by a discrete value, a latent variable may be represented by continuous values which can be any values in a section defined by discrete values that can be taken by the attribute. A generator 2 obtains sufficient expressiveness by representing each attribute with a latent variable having continuous values. Likewise, when an attribute is represented by a given distribution, a latent variable may be represented by a more detailed distribution than the given distribution. The generator 2 obtains sufficient expressiveness by representing each attribute using a latent variable that follows the more detailed distribution. It is to be noted that among a plurality of latent variables, a latent variable (a latent variable $z_a$ in FIG. 3) that is constrained by an attribute vector y to be described below is a latent variable representing an attribute. Moreover, among a plurality of latent variables, a latent variable (a latent variable $z_i$ in FIG. 3) that is not constrained by the attribute vector y is a latent variable representing identity.

Moreover, when an attempt is made to honestly learn the structures of an encoder 1 (FIG. 2) and the generator 2 (FIG. 3), learning is performed so that the error between true data and data generated via the encoder 1 and the generator 2 is small. At this time, definite constraints cannot be given with respect to what is represented by each of the latent variable and the attribute vector y.

Figure 4:
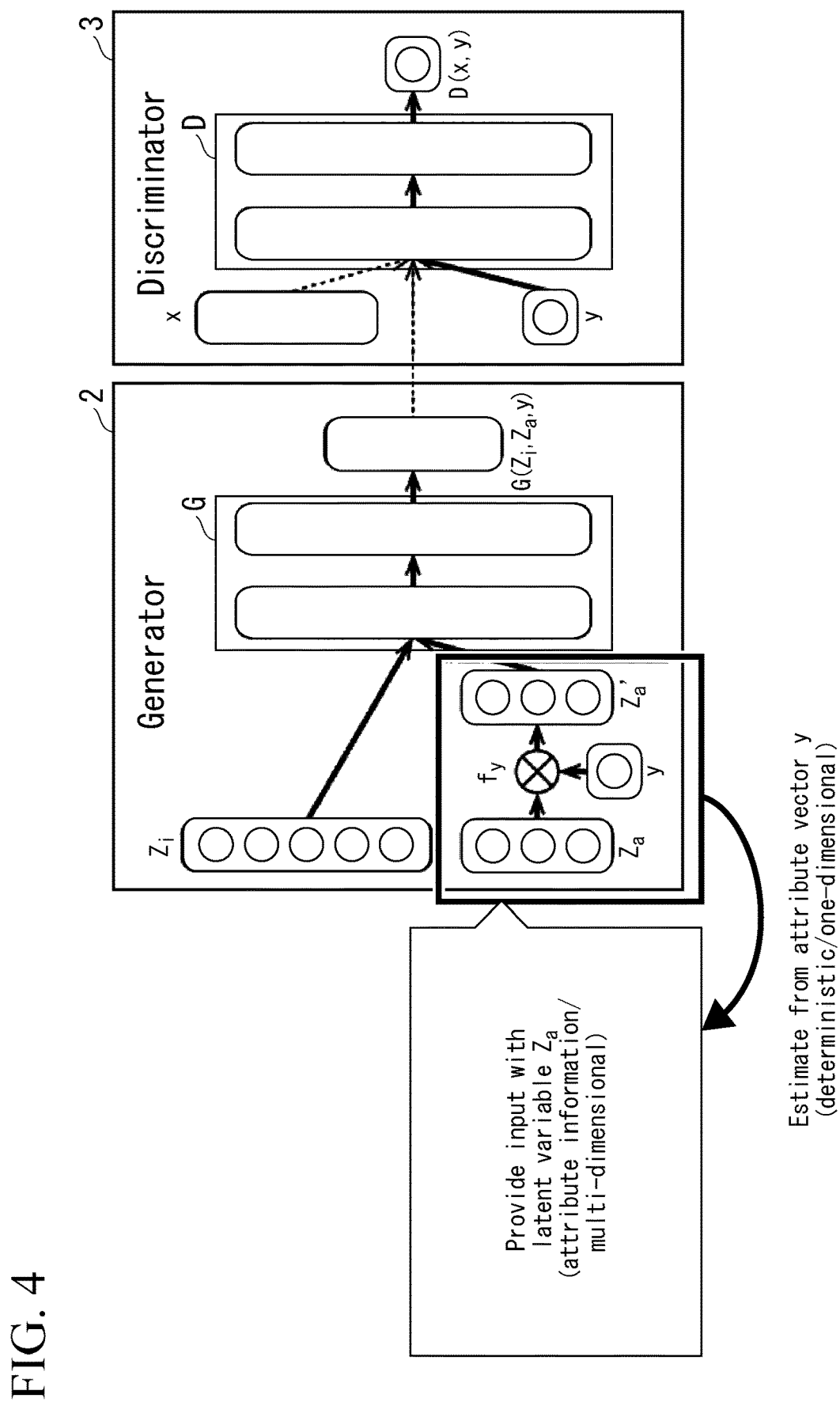
FIG. 4 is a diagram explaining a method for learning a generator and a discriminator.

Therefore, in the present embodiment, as shown in FIG. 4, conditional filtered generative adversarial networks (CF-GANs) are learned together when the generator 2 is learned. At this time, the CFGAN is constrained so that an image generated on the basis of a latent variable generated from a given data distribution includes a given latent variable or does not include the given attribute depending on the attribute vector y. Moreover, a discriminator 3 discriminates whether or not the generated image follows the same distribution as a true image under the presence or absence or positive or negative of each attribute represented by the attribute vector y. That is, the discriminator 3 discriminates whether or not the generated image is a true image. It is to be noted that the positive or negative of an attribute is, for example, "male/female", as will be described below. Thereby, various latent variables $z_i$ and $z_a$ can be constrained so as to represent identity and an attribute, respectively.

Moreover, in the present embodiment, when an attribute of an image is to be changed, the attribute is changed while the identity is maintained.

<Configuration of Signal Change Apparatus According to First Embodiment of Present Invention>

Figure 5:
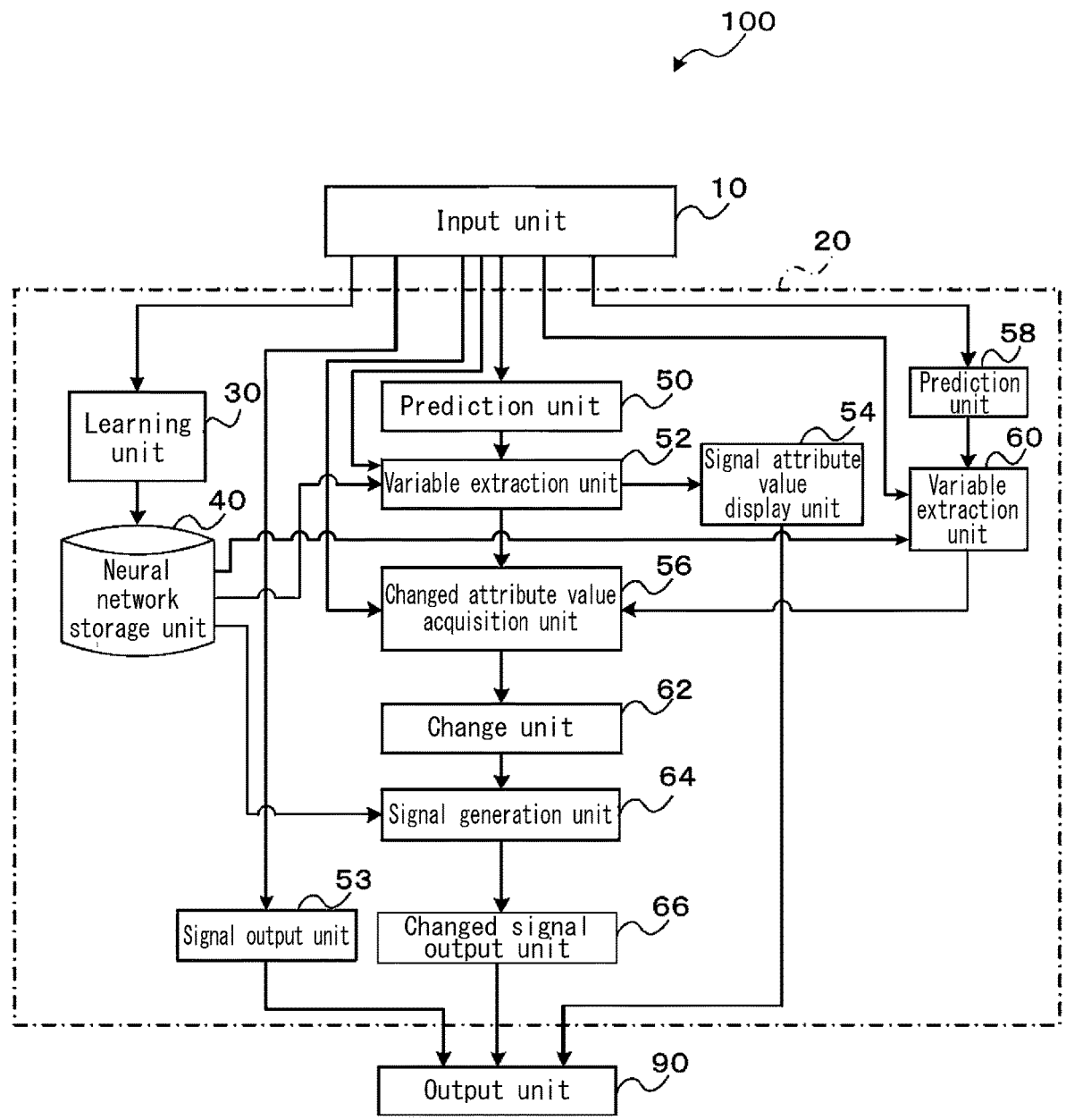
FIG. 5 is a block diagram showing a configuration of a signal change apparatus according to first and second embodiments of the present invention.

Next, a configuration of a signal change apparatus according to the first embodiment of the present invention will be described. As shown in FIG. 5, the signal change apparatus 100 according to the first embodiment of the present invention can be configured by a computer including a central processing unit (CPU), a random access memory (RAM), and a read only memory (ROM) that stores programs for executing a learning process routine and a generation process routine to be described below and various types of data.

As shown in FIG. 5, the signal change apparatus 100 functionally includes an input unit 10, an arithmetic unit 20, and an output unit 90.

The input unit 10 receives a plurality of pairs of image data x and an attribute vector y as learning data. Moreover, the input unit 10 receives image data x that is a change target.

The arithmetic unit 20 includes a learning unit 30, a neural network storage unit 40, a prediction unit 50, a variable extraction unit 52, a signal output unit 53, a signal attribute value display unit 54, a changed attribute value acquisition unit 56, a prediction unit 58, a variable extraction unit 60, a change unit 62, a signal generation unit 64, and a changed signal output unit 66.

The learning unit 30 learns these neural networks so that a neural network G serving as the generator 2 and a neural network D serving as the discriminator 3 follow optimization conditions that contend with each other on the basis of the input learning data. The neural network G serving as the generator 2 receives a generated latent variable $z_i$ representing identity and a generated latent variable $z_a'$ representing each attribute and generates image data from the latent variable $z_i$ representing identity and the latent variable $z_a'$ representing each attribute. The neural network D serving as the discriminator 3 discriminates whether or not the generated image data follows the same distribution as true image data x under the attribute vector y representing each attribute of the image data. That is, the neural network D serving as the discriminator 3 discriminates whether or not the generated image data is the true image data x. For example, the attribute vector y represents the presence or absence of an attribute or positive or negative of an attribute. However, the attribute vector y is not particularly limited thereto. The latent variable $z_a'$ representing each attribute that becomes an input to the neural network G serving as the generator 2 is obtained by converting the latent variable $z_a$ representing each attribute using the value of the attribute vector y. As an example of conversion, it is conceivable that the generated latent variable $z_a$ representing each attribute is multiplied by the attribute vector y as shown in the following formula when the attribute vector y represents the presence or absence of an attribute (i.e., y=1 when an attribute is present and y=0 when the attribute is absent).

[Expression 1]

$$z_a' = \begin{cases} z_a & (y=1) \\ 0 & (y=0) \end{cases} \qquad (1)$$

Alternatively, it is conceivable that a positive value ($|z_a|$) (when y=1) or a negative value ($-|z_a|$) (when y=0) is assigned to the generated latent variable $z_a$ representing each attribute in accordance with the attribute vector y as shown in the following formula when the attribute vector y represents positive or negative of an attribute.

[Expression 2]

$$z_a' = \begin{cases} |z_a| & (y=1) \\ -|z_a| & (y=0) \end{cases} \qquad (2)$$

Specifically, the learning unit 30 receives image data x and the attribute vector y of the input learning data and the latent variable $z_i$ representing identity and the latent variable $z_a$ representing each attribute generated from a given data distribution. Here, when the image data x is face image data, the attribute vector y represents the presence or absence of each of "glasses", "makeup", "beard", and "bangs" and the distinction between "male/female", "not smile/smile", and "old/young", and the latent variable $z_a$ representing an attribute represents the diversity within each attribute (e.g., representing "What type of glasses are they?"). The learning unit 30 may generate the latent variable $z_i$ representing identity and the latent variable $z_a$ representing each attribute using random numbers.

Moreover, when the latent variable $z_a$ representing an attribute is generated from a given data distribution, the learning unit 30 generates the latent variable $z_a$ representing the attribute in accordance with the following formula, if, for example, the latent variable $z_a$ representing the attribute is discrete.

[Expression 3]

$$z_a \sim \text{Cat}\left(K = k, p = \frac{1}{k}\right) \quad (3)$$

where k represents the number of categories (the number of discrete values). Moreover, Cat represents a distribution having values indicating categories equal in number to the number of categories K, and p represents a probability.

Moreover, when the latent variable $z_a$ representing the attribute is continuous, the learning unit 30 generates the latent variable $z_a$ representing the attribute in accordance with the following formula.

[Expression 4]

$$z_a \sim \text{Unif}(-1,1) \quad (4)$$

where Unif(−1, 1) is a uniform distribution in which the range of values is from −1 to 1.

It is to be noted that a latent variable $z_a$ that follows another distribution and conversion can be adopted. For example, it is possible to use a normal distribution instead of the uniform distribution (Unif (−1, 1)) as the distribution of the latent variable $z_a$ and it is also possible to change the range of values.

Moreover, the learning unit 30 receives the generated latent variable $z_i$ representing identity and the generated latent variable $z_a'$ representing each attribute and generates image data using the neural network G serving as the generator 2. At this time, the latent variable $z_a'$ representing each attribute that is an input of the neural network G serving as the generator 2 is obtained by converting the latent variable $z_a$ representing each attribute using the value of the attribute vector y.

Then, the learning unit 30 updates a parameter of the neural network G serving as the generator 2 so as to satisfy a constraint that the discriminator 3 discriminates that the generated image data follows the same distribution as the true image data under the attribute vector y as much as possible. That is, the parameter of the neural network G serving as the generator 2 is updated so that the discriminator 3 discriminates the generated image as the true image data.

Moreover, the learning unit 30 updates a parameter of the neural network D serving as the discriminator 3 so as to satisfy a constraint that the discriminator 3 discriminates that the generated image data does not follow the same distribution as the true image data under the attribute vector y as much as possible and so as to satisfy a constraint that the discriminator 3 discriminates that the true image data x follows the same distribution as the true image data.

It is to be noted that the optimization conditions that the neural network G serving as the generator 2 and the neural network D serving as the discriminator 3 contend with each other are represented by the following formula.

[Expression 5]

$$\min_G \max_D \mathbb{E}_{x,y \sim P_{data}(x,y)}[\log D(x, y)] + \\ \mathbb{E}_{z_i \sim P_{z_i}(z_i), z_a \sim P_{z_a} \sim P_y(y)}[\log(1 - D(G(z_i, z_a, y), y))] \quad (5)$$

where

[Expression 6]

$$x, y \sim P_{data}(x, y) \quad (6)$$

represents that the true image data x and the attribute vector y are sampled from the learning data.

Moreover, $$z_i \sim P_{z_i}(z_i) \quad \text{[Expression 7]}$$

represents that a latent variable $z_i$ representing identity is generated from a given data distribution. For example, the latent variable $z_i$ representing identity is generated by a random number.

Moreover, $$z_a \sim P_{z_a}(z_a) \quad \text{[Expression 8]}$$

represents that a latent variable $z_a$ representing an attribute is generated from a given data distribution. For example, the latent variable $z_a$ representing the attribute is generated by a random number.

Moreover, $$y \sim P_y(y) \quad \text{[Expression 9]}$$

represents that the attribute vector y is sampled from the learning data.

Moreover, E represents an expected value.

The learning unit 30 performs the above-described process for each piece of the learning data and iteratively updates the parameter of the neural network G serving as the generator 2 and the parameter of the neural network D serving as the discriminator 3.

The neural network G serving as the generator 2 and the neural network D serving as the discriminator 3 which are finally obtained are stored in the neural network storage unit 40.

Next, as shown in FIG. 2, the learning unit 30 receives image data x included in the input learning data and extracts a latent variable $z_i$ representing identity and a latent variable $z_a$ representing each attribute using the neural network E serving as the encoder 1.

Moreover, as shown in FIG. 3, the learning unit 30 receives the extracted latent variable $z_i$ representing identity and the latent variable $z_a'$ representing each attribute and generates image data $G(z_i, z_a, y)$ using the neural network G serving as the generator 2. At this time, the latent variable $z_a'$ representing each attribute is obtained by converting the latent variable $z_a$ representing each attribute output by the neural network E serving as the encoder 1 using the value of the attribute vector y. It is to be noted that in FIG. 3, $f_y$ is a filter function used for conversion. As an example of the conversion, it is conceivable that the latent variable $z_a$ representing each attribute output by the neural network E serving as the encoder 1 is multiplied by the attribute vector y.

Moreover, the learning unit 30 updates the parameter of the neural network E serving as the encoder 1 so as to satisfy a constraint that the generated image data is the same as the original image data x.

The learning unit 30 performs the above-described process for each piece of the learning data and iteratively updates the parameter of the neural network E serving as the encoder 1.

The neural network E serving as the encoder 1 which is finally obtained is stored in the neural network storage unit 40.

The prediction unit 50 inputs image data x of the change target received by the input unit 10 to a pre-learned neural network (e.g., convolutional neural networks (CNNs)) serving as a predictor (not shown) for predicting the attribute vector y and predicts the attribute vector y.

The neural network serving as the predictor outputs the attribute vector y. The attribute vector y is, for example, a classification of the presence or absence of each attribute or positive or negative of each attribute. However, the attribute vector y is not particularly limited thereto.

The variable extraction unit 52 receives the input image data x of the change target and extracts a latent variable $z_i$ representing identity of the image data x of the change target and a latent variable $z_a$ representing each attribute of the image data x of the change target using the neural network E serving as the encoder 1 stored in the neural network storage unit 40. Moreover, the variable extraction unit 52 obtains a latent variable $z_a'$ representing each attribute on the basis of the extracted latent variable $z_a$ representing each attribute and the attribute vector y predicted by the prediction unit 50. At this time, the latent variable $z_a'$ representing each attribute is obtained by converting the latent variable $z_a$ representing each attribute extracted by the variable extraction unit 52 using the value of the attribute vector y predicted by the prediction unit 50. As an example of conversion, it is conceivable that the latent variable $z_a$ representing each attribute is multiplied by the attribute vector y. Because each attribute is represented by a plurality of latent variables $z_a$ for each of the attributes, all of a plurality of latent variables corresponding to each attribute are multiplied by the elements of the attribute vector y.

The signal output unit 53 causes the output unit 90 to display the input image data x of the change target in an image display region 98A of an attribute change screen 92, as shown in FIG. 1.

The signal attribute value display unit 54 causes the output unit 90 to display a latent variable $z_a'$ representing each attribute of the image data x of the change target in a state in which an instruction for changing the value can be received. Specifically, as shown in FIG. 1, the value of the latent variable $z_a'$ is displayed in the attribute change screen 92 by means of any controller such as a radio button 94 or a slide bar 96 indicating the value of the latent variable $z_a'$ representing each attribute in a state in which the instruction for changing the value of the latent variable $z_a'$ representing each attribute can be received.

Moreover, reference image data that are transfer sources of the attributes are displayed in reference image display regions 98B of the attribute change screen 92 and radio buttons 94 for selecting the reference image data are displayed so as to correspond to the reference image display regions 98B. It is to be noted that a method for acquiring reference image data is not particularly limited. For example, reference image data may be acquired as needed from an external network or the like via the input unit 10, or reference image data may be acquired in advance via the input unit 10 and the acquired reference image data may be stored in a storage unit (not shown).

The changed attribute value acquisition unit 56 acquires a changed value of the latent variable $z_a'$ representing the attribute of the change target when the instruction for changing the value of the latent variable $z_a'$ representing the attribute of the change target (e.g., an operation on a radio button 94 or a slide bar 96 indicating the value of the latent variable $z_a'$ representing the attribute) is received in the attribute change screen 92.

When an operation on a radio button 94 has been received, the changed attribute value acquisition unit 56 acquires the changed value of the latent variable $z_a'$ representing the attribute of the change target determined in advance for the operated radio button 94.

Moreover, when an operation on a slide bar 96 corresponding to a latent variable related to the presence or absence of an attribute such as an attribute "bangs" or an attribute "makeup" has been received, the changed attribute value acquisition unit 56 acquires the changed value of the latent variable $z_a'$ representing the attribute of the change target determined in advance for the position of the slide bar 96 that has been operated.

Moreover, when an operation on a slide bar 96 corresponding to a latent variable related to positive or negative of an attribute such as an attribute "male/female" or an attribute "not smile/smile" has been received, the changed attribute value acquisition unit 56 acquires the changed value of the latent variable $z_a'$ representing the attribute of the change target determined in advance for the position of the slide bar 96 that has been operated.

Moreover, when an operation on a radio button 94 for selecting reference image data has been received in the attribute change screen 92, the prediction unit 58 first inputs the selected image data x of a reference target to a pre-learned neural network (CNN) (not shown) for predicting the attribute vector y and predicts the attribute vector y. Moreover, the variable extraction unit 60 receives the selected image data x of the reference target and extracts the latent variable $z_i$ representing identity and the latent variable $z_a$ representing each attribute of the image data x of the reference target using the neural network E serving as the encoder 1 stored in the neural network storage unit 40. Then, the variable extraction unit 60 obtains the latent variable $z_a'$ representing each attribute of the image data x of the reference target by converting the extracted latent variable $z_a$ representing each attribute using the value of the attribute vector y predicted by the prediction unit 58. The changed attribute value acquisition unit 56 acquires the latent variable $z_a'$ representing each attribute of the image data x of the reference target as a changed value of the latent variable $z_a'$ representing the attribute of the change target.

The change unit 62 changes the value of the latent variable $z_a'$ representing the attribute of the change target by replacing the value of the latent variable $z_a'$ representing the attribute of the change target acquired by the changed attribute value acquisition unit 56 among latent variables $z_a'$ representing each attribute obtained by the variable extraction unit 52 with the changed value.

The signal generation unit 64 receives the latent variable $z_i$ representing identity extracted by the variable extraction unit 52 and the latent variable $z_a'$ representing each attribute after the change by the change unit 62 and generates image data using the neural network G serving as the generator 2 stored in the neural network storage unit 40.

The changed signal output unit 66 causes the output unit 90 to display the image data generated by the signal generation unit 64 in the image display region 98A of the attribute change screen 92, as shown in FIG. 1.

<Operation of Signal Change Apparatus According to First Embodiment of Present Invention>

Next, an operation of the signal change apparatus 100 according to the first embodiment of the present invention will be described. The signal change apparatus 100 executes a learning process routine and a generation process routine to be described below.

Figure 6:
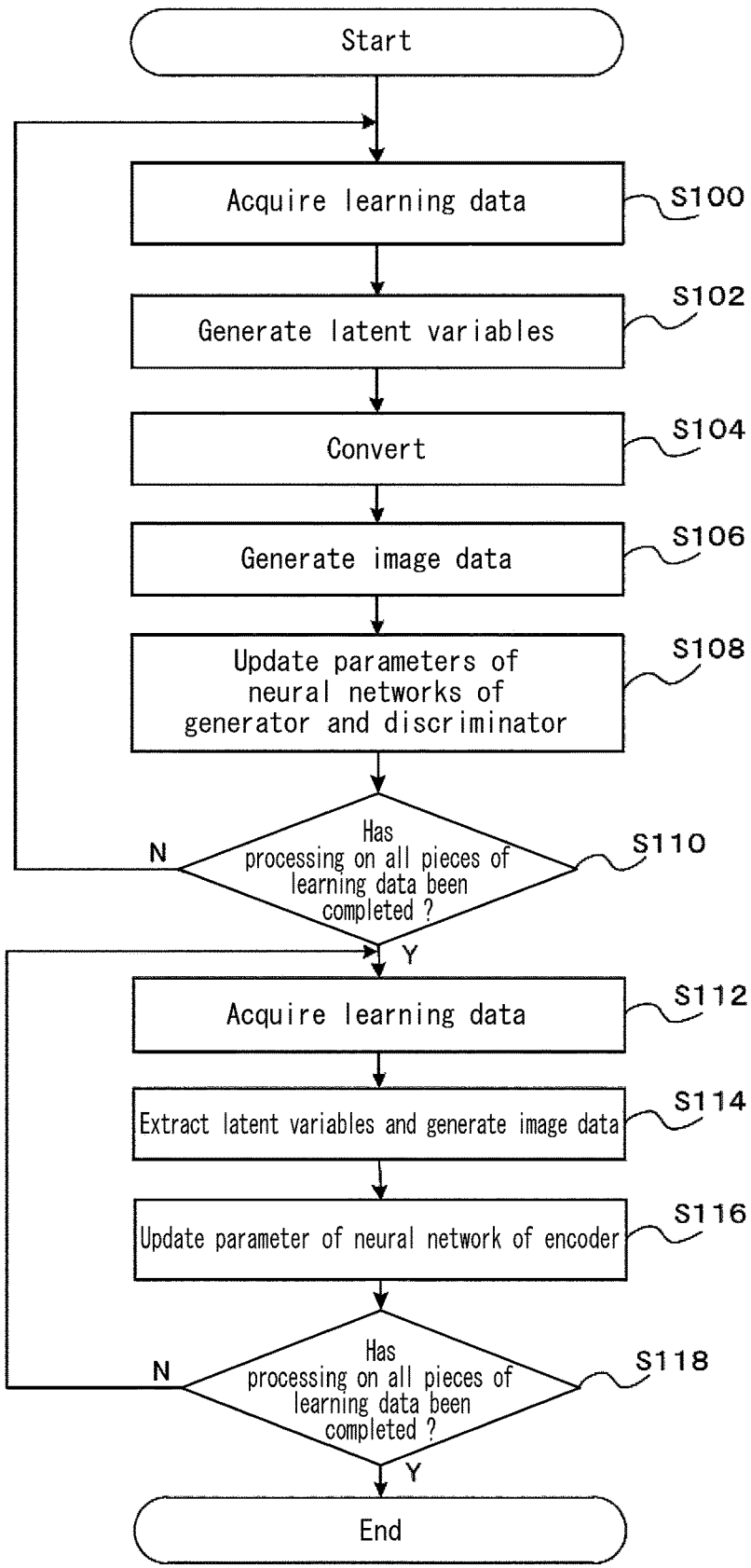
FIG. 6 is a flowchart showing a learning process routine in the signal change apparatus according to the first and second embodiments of the present invention.

First, the learning process routine will be described. When the input unit 10 receives a plurality of pairs of image data x and an attribute vector y as learning data, the signal change apparatus 100 executes the learning process routine shown in FIG. 6.

First, in step S100, the learning unit 30 acquires any one of a plurality of pieces of learning data received by the input unit 10.

Next, in step S102, the learning unit 30 generates a latent variable $z_i$ representing identity and a latent variable $z_a$ representing each attribute from a given data distribution.

In step S104, the learning unit 30 obtains a latent variable $z_a'$ representing each attribute by converting the latent variable $z_a$ representing each attribute generated in step S102 using the value of the attribute vector y acquired in step S100.

Then, in step S106, the learning unit 30 receives the latent variable $z_i$ representing identity and the latent variable $z_a'$ representing each attribute obtained by the conversion, which have been obtained in the steps S102 and S104, respectively, and generates image data x' using the neural network G serving as the generator 2.

In step S108, the learning unit 30 updates a parameter of the neural network G serving as the generator 2 and a parameter of the neural network D serving as the discriminator 3 on the basis of the latent variable $z_i$ representing identity generated in the step S102, the latent variable $z_a'$ representing each attribute, the image data x' generated in the step S106, and the image data x and the attribute vector y included in the learning data obtained in step S100.

In step S110, the learning unit 30 determines whether or not the processing of the steps S100 to S108 has been executed on all the pieces of the learning data. When there is learning data on which the processing of the steps S100 to S108 has not been executed, the learning unit 30 returns the processing to the step S100 and acquires the learning data. In contrast, when the processing of the steps S100 to S108 has been executed on all the pieces of the learning data, the learning unit 30 stores the parameter of the neural network G serving as the generator 2 and the parameter of the neural network D serving as the discriminator 3 that have been finally obtained in the neural network storage unit 40.

Next, in step S112, the learning unit 30 acquires any one of the plurality of pieces of learning data received by the input unit 10.

In step S114, the learning unit 30 receives image data x and an attribute vector y included in the learning data obtained in step S112 and extracts the latent variable $z_i$ representing identity and the latent variable $z_a$ representing each attribute using the neural network E serving as the encoder 1. Moreover, the learning unit 30 receives the extracted latent variable $z_i$ representing identity and the extracted latent variable $z_a'$ representing each attribute and generates image data using the neural network G serving as the generator 2. At this time, the latent variable $z_a'$ representing each attribute is obtained by converting the extracted latent variable $z_a$ representing each attribute using the value of the attribute vector y of the image data.

In step S116, the learning unit 30 updates a parameter of the neural network E serving as the encoder 1 on the basis of the generated image data and the image data x included in the learning data obtained in step S112.

In step S118, the learning unit 30 determines whether or not the processing of the steps S112 to S116 has been executed on all the pieces of the learning data. When there is learning data on which the processing of the steps S112 to S116 has not been executed, the learning unit 30 returns the processing to the step S112 and acquires the learning data. In contrast, when the processing of the steps S112 to S116 has been executed on all the pieces of the learning data, the learning unit 30 completes the learning process routine and stores the finally obtained parameter of the neural network E serving as the encoder 1 in the neural network storage unit 40.

Figure 7:
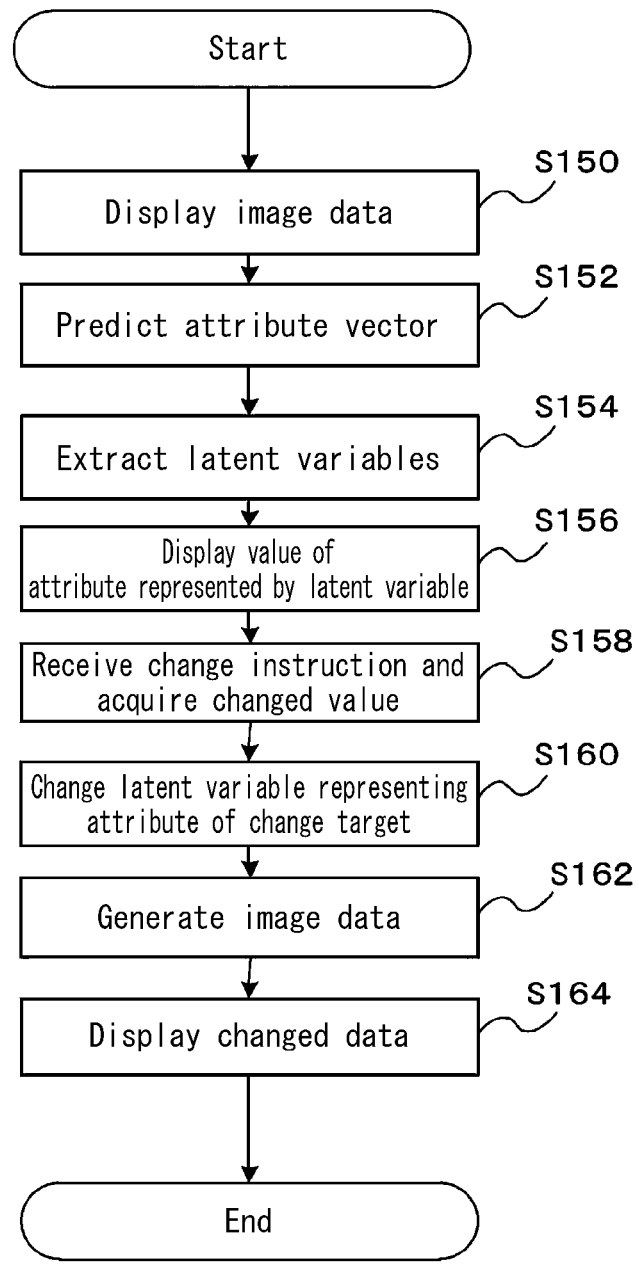
FIG. 7 is a flowchart showing a generation process routine in the signal change apparatus according to the first and second embodiments of the present invention.

Next, the generation process routine will be described. When the input unit 10 receives image data of the change target, the signal change apparatus 100 executes the generation process routine shown in FIG. 7.

In step S150, the signal output unit 53 causes the output unit 90 to display the input image data of the change target in the image display region 98A of the attribute change screen 92, as shown in FIG. 1.

In step S152, the prediction unit 50 predicts the attribute vector y using the pre-learned neural network serving as the predictor on the basis of the image data of the change target received by the input unit 10.

In step S154, the variable extraction unit 52 receives the image data of the change target received by the input unit 10 and extracts a latent variable $z_i$ representing identity and a latent variable $z_a$ representing each attribute using the neural network E serving as the encoder 1 stored in the neural network storage unit 40. Moreover, the variable extraction unit 52 obtains a latent variable $z_a'$ representing each attribute on the basis of the extracted latent variable $z_a$ representing each attribute and the attribute vector y predicted in step S152. At this time, the latent variable $z_a'$ representing each attribute is obtained by converting the extracted latent variable $z_a$ representing each attribute using the value of the predicted attribute vector y.

In step S156, the signal attribute value display unit 54 causes the output unit 90 to display the latent variable $z_a'$ representing each attribute of the image data x of the change target obtained in the step S154 in a state in which an instruction for changing the value can be received. Specifically, as shown in FIG. 1, the signal attribute value display unit 54 displays the value of the latent variable $z_a'$ in the attribute change screen 92 by means of a radio button 94 or a slide bar 96 indicating the value of the latent variable $z_a'$ representing each attribute in a state in which the instruction for changing the value of the latent variable $z_a'$ representing each attribute can be received. Moreover, the signal attribute value display unit 54 displays reference image data that are prepared in advance and that serve as transfer sources of the attributes in the reference image display regions 98B of the attribute change screen 92.

In step S158, the changed attribute value acquisition unit 56 acquires a changed value of the latent variable $z_a'$ representing the attribute of the change target when the instruction for changing the value of the latent variable $z_a'$ representing the attribute of the change target (e.g., an operation on the radio button 94 or the slide bar 96 indicating the value of the latent variable $z_a'$ representing the attribute) is received in the attribute change screen 92.

Moreover, when an operation on a radio button 94 for selecting reference image data has been received in the attribute change screen 92, the prediction unit 58 inputs the selected image data x of the reference target to a pre-learned neural network for predicting the attribute vector y and predicts the attribute vector y. Moreover, the variable extraction unit 60 receives the selected image data x of the reference target and extracts the latent variable $z_i$ representing identity and the latent variable $z_a$ representing each attribute of the image data x of the reference target using the neural network E serving as the encoder 1 stored in the neural network storage unit 40. Then, the variable extraction unit 60 obtains the latent variable $z_a'$ representing each attribute of the image data x of the reference target by converting the extracted latent variable $z_a$ representing each attribute using the value of the predicted attribute vector y. The changed attribute value acquisition unit 56 acquires the latent variable $z_a'$ representing each attribute of the image data x of the reference target as the changed value of the latent variable $z_a'$ representing the attribute of the change target.

In step S160, the change unit 62 changes the value of the latent variable $z_a'$ representing the attribute of the change target by replacing the value of the latent variable $z_a'$ representing the attribute of the change target acquired in the step S158 among latent variables $z_a'$ representing each attribute obtained in the step S154 with the changed value.

Then, in step S162, the signal generation unit 64 receives the latent variable $z_i$ representing identity extracted in the step S154 and the latent variable $z_a'$ representing each attribute for which the change process has been performed in step S160 and generates image data using the neural network G serving as the generator 2 stored in the neural network storage unit 40.

Then, in step S164, the changed signal output unit 66 causes the output unit 90 to display the generated image data in the image display region 98A of the attribute change screen 92, as shown in FIG. 1, and completes the generation process routine.

As described above, the signal change apparatus according to the first embodiment of the present invention displays the value of a latent variable representing an attribute in a state in which an instruction for changing the value of a latent variable representing each attribute extracted with respect to image data of a change target can be received and outputs changed image data in which the attribute has been changed on the basis of the changed value of the latent variable representing the attribute when the instruction for changing the value of the latent variable representing the attribute is received. Thereby, it is possible to appropriately change the image data.

Moreover, the signal change apparatus according to the first embodiment of the present invention extracts a latent variable of the input image data using the neural network E serving as the encoder 1, changes the value of the extracted latent variable, and generates image data using the neural network G serving as the generator 2 that takes the changed latent variable as input. Thereby, it is possible to appropriately change image data.

Moreover, the signal change apparatus according to the first embodiment of the present invention can represent the diversity of an attribute because there are a plurality of latent variables for each attribute. Moreover, the signal change apparatus according to the first embodiment of the present invention can control only the value of one of the plurality of latent variables for one attribute. For example, when only an attribute (e.g., glasses) is changed, it is only necessary to interactively change each dimension of a multi-dimensional latent variable $z_a$ while fixing the latent variable $z_i$ representing identity. When only identity is changed while the attributes are maintained, it is only necessary to change the latent variable $z_i$ representing identity while fixing the latent variables $z_a$ representing each attribute.

Moreover, the signal changing apparatus according to the first embodiment of the present invention generates a latent variable representing identity and a latent variable representing each attribute in image data and learns the neural network G serving as the generator 2 and the neural network D serving as the discriminator 3 for discriminating whether or not the generated image data follows the same distribution as true image data under the attribute vector in accordance with optimization conditions that contend with each other on the basis of the input true image data, the input attribute vector representing each attribute in image data intended to be generated, the generated latent variable representing identity, and the generated latent variable representing each attribute. Thereby, it is possible to learn the neural network G serving as the generator 2 capable of generating image data and the neural network D serving as the discriminator 3 while controlling attributes.

It is to be noted that the above-described embodiment describes an example in which the neural network G serving as the generator 2 and the neural network D serving as the discriminator 3 are learned in accordance with optimization conditions that contend with each other. However, the constraint is not limited thereto. For example, a constraint may be further provided so that each latent variable represents an independent one. Specifically, as shown in the following formula, a constraint is further provided so that a correlation (information amount) between the latent variable $z_a'$ and image data generated from the latent variable $z_a'$ becomes large.

[Expression 10]

$$I(z_a'; G(z_i, z_a, y) | y) = H(z_a' | G(z_i, z_a, y), y) = \qquad (6)$$
$$H(z_a' | y) + \mathbb{E}_{x \sim G(z_i, z_a, y)}[\mathbb{E}_{\hat{z}_a' \sim P(z_a' | x, y)}[\log P(\hat{z}_a' | x, y)]] =$$
$$H(z_a' | y) + \mathbb{E}_{x \sim G(z_i, z_a, y)}$$
$$[D_{KL}(P(\cdot | x, y) \| Q(\cdot | x, y) + \mathbb{E}_{\hat{z}_a' \sim P(z_a' | x, y)}[\log Q(\hat{z}_a' | x, y)]] \geq$$
$$H(z_a' | y) + \mathbb{E}_{x \sim G(z_i, z_a, y)}[\mathbb{E}_{\hat{z}_a' \sim P(z_a' | xy)}[\log Q(\hat{z}_a' | x, y)]] =$$
$$H(z_a' | y) + \mathbb{E}_{\hat{z}_a' \sim P(z_a' | y), x \sim G(z_i, z_a')}[\log Q(z_a' | x, y)].$$

It is to be noted that $I(z_a'; G(z_i, z_a, y)|y)$ represents the amount of mutual information between the latent variable $z_a'$ and the image data $G(z_i, z_a, y)$ when the attribute vector y is given. H represents conditional entropy. $D_{KL}$ represents Kullback-Leibler divergence. $P(z_a'|x, y)$ represents a distribution of latent variables $z_a'$ when the image data x and the attribute vector y are given. $z_a'^{\wedge}$ (^ is attached above $z_a$) is a latent variable obtained in accordance with the distribution $P(z_a'|x, y)$.

Because $P(z_a'|x, y)$ is unknown, it is difficult to directly obtain the amount of information I. Thus, as described above, an approximation distribution $Q(z_a'|x, y)$ for approximating $P(z_a'|x, y)$ is introduced and a neural network for estimating the approximation distribution $Q(z_a'|x, y)$ is learned and optimization conditions that contend with each other are optimized so that a lower limit of the amount of information I is maximized using calculus of variations.

Thereby, when a plurality of latent variables for the attribute "glasses" include a latent variable $z_a{}^1$ and a latent variable $z_a{}^2$ and the latent variable $z_a{}^1$ related to the attribute "glasses" represents sunglasses, the latent variable $z_a{}^2$ represents glasses other than sunglasses.

Moreover, the first embodiment describes an example in which the neural network E serving as the encoder 1 simultaneously estimates the latent variable $z_a$ representing the attribute and the latent variable $z_i$ representing identity. However, a method for estimating the latent variables is not limited thereto. For example, the neural network E serving as the encoder 1 may simultaneously estimate the latent variable $z_a'$ representing the attribute and the latent variable $z_i$ representing identity by directly estimating the latent variable $z_a'$ representing the attribute instead of the latent variable $z_a$ representing the attribute.

Moreover, if the neural network for estimating the approximation distribution $Q(z_a'|x, y)$ is learned together when the neural network G serving as the generator 2 is learned, the latent variable $z_a'$ representing the attribute may be estimated using the neural network for estimating the approximation distribution and the neural network E serving as the encoder 1 may estimate only the latent variable $z_i$ representing identity.

Moreover, the optimum latent variable $z_i$ representing identity may be obtained by inputting any latent variable $z_i$ representing identity to the neural network G serving as the generator 2 without using the neural network E serving as the encoder 1 and updating the latent variable $z_i$ representing identity using a gradient method so that the output of the neural network G serving as the generator 2 is close to the target image x. Moreover, the optimum latent variable $z_i$ representing identity may be obtained by obtaining a latent variable $z_a'$ representing an attribute and a latent variable $z_i$ representing identity using the neural network E serving as the encoder 1, setting the latent variable $z_a'$ and the latent variable $z_i$ as initial values, inputting the latent variable $z_i$ representing identity to the neural network G serving as the generator 2, and updating the latent variable $z_i$ representing identity using a gradient method so that the output of the generator 2 is close to the target image x. Moreover, the neural network E serving as the encoder 1 or the neural network serving as the predictor may be learned together with the neural network G serving as the generator 2 and the neural network D serving as the discriminator 3.

Next, a signal change apparatus according to a second embodiment of the present invention will be described. It is to be noted that because components of the signal change apparatus according to the second embodiment are similar to those of the signal change apparatus according to the first embodiment, the components are denoted by the same reference signs and a description thereof will be omitted.

The second embodiment is different from the first embodiment in that latent variables representing each attribute are hierarchically structured.

Overview of Second Embodiment of Present Invention

Next, an overview of the second embodiment of the present invention will be described.

Figure 8:
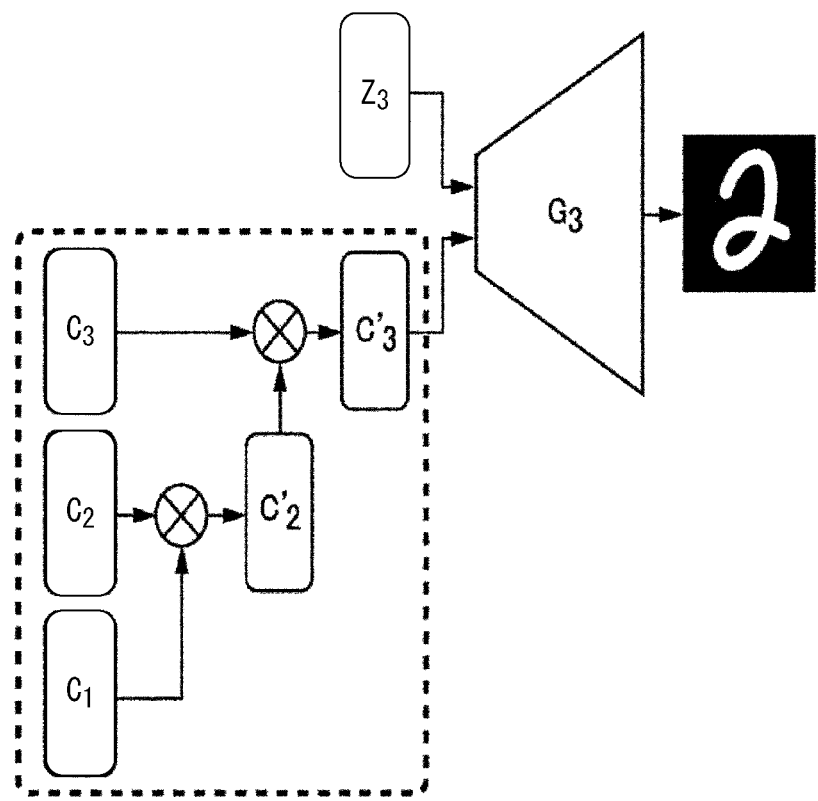
FIG. 8 is a conceptual diagram of a generator in the second embodiment of the present invention.

In order to achieve hierarchical control of attributes, the second embodiment has a structure in which a latent variable representing each attribute is hierarchically converted into latent variables of two or more layers as shown in FIG. 8. Moreover, a latent variable $c_1$ of a first layer represents each attribute and corresponds to the attribute vector y in the first embodiment. The latent variable represents, for example, the presence or absence of an attribute or positive or negative of an attribute. However, latent variables are not particularly limited thereto.

A latent variable $c_2$ of a second layer is converted using the value of the latent variable $c_1$ of the first layer and a conversion result $c_2'$ is obtained. Moreover, a latent variable $c_3$ of a third layer is converted using the value of the conversion result $c_2'$ for the latent variable $c_2$ of the second layer and a conversion result $c_3'$ is obtained. Then, the signal change apparatus 100 receives a latent variable $z_3$ representing identity and the conversion result $c_3'$ and generates image data using a neural network $G_3$ serving as the generator.

Figure 9:
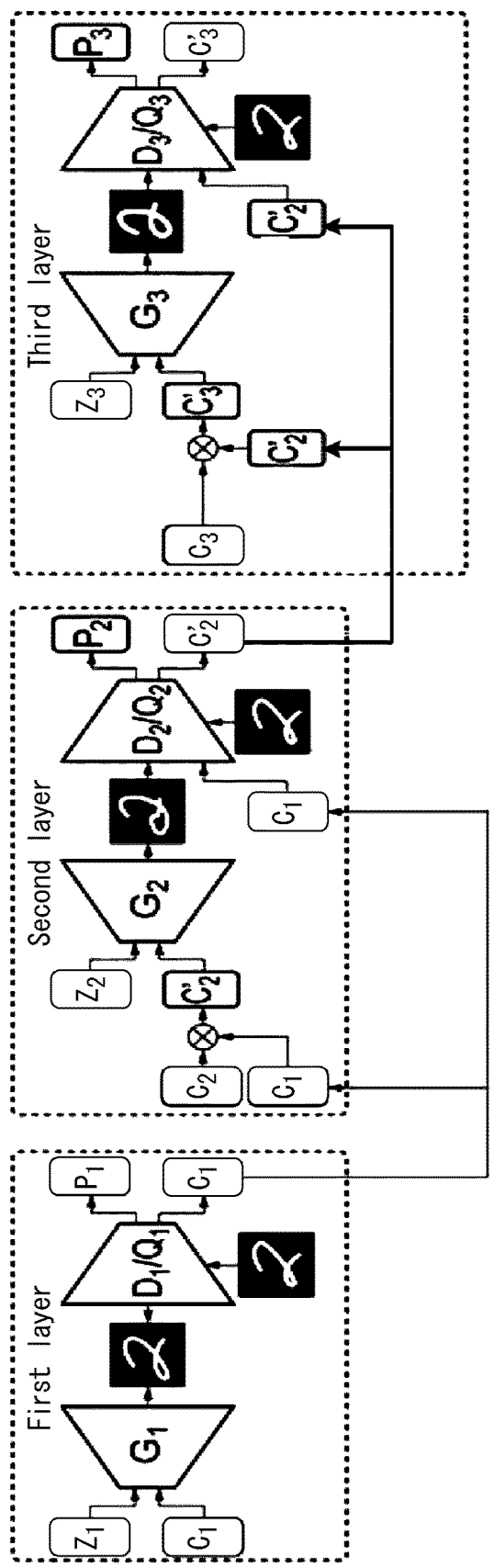
FIG. 9 is a conceptual diagram of generators, discriminators, and approximation distributions in the second embodiment of the present invention.

Moreover, in learning of the neural networks, as shown in FIG. 9, the signal change apparatus 100 receives the latent variable $c_1$ and a latent variable $z_i$ representing identity of the first layer, and learns a neural network $G_1$ for generating image data, a neural network $D_1$ serving as a discriminator, and a neural network $Q_1$ serving as an approximation distribution. Moreover, the signal change apparatus 100 receives the conversion result $c_2'$ for the latent variable of the second layer and a latent variable $z_2$ representing identity, and learns a neural network $G_2$ for generating image data, a neural network $D_2$ serving as a discriminator, and a neural network $Q_2$ serving as an approximation distribution. Furthermore, the signal change apparatus 100 receives the conversion result $c_3'$ for the latent variable of the third layer and a latent variable $z_3$ representing identity, and learns the neural network $G_3$ for generating image data, a neural network $D_3$ serving as a discriminator, and a neural network $Q_3$ serving as an approximation distribution. It is to be noted that in FIG. 9, $P_1$, $P_2$, and $P_3$ are discrimination results by the neural networks $D_1$, $D_2$, and $D_3$ serving as the discriminators, respectively. Moreover, $c_1$, $c_2'$, and $c_3'$ respectively obtained in the first to third layers are latent variables representing attributes predicted by the neural networks $Q_1$, $Q_2$, and $Q_3$ serving as the approximation distributions.

In this manner, the signal change apparatus 100 learns the neural network serving as the generator, the neural network serving as the discriminator, and the neural network serving as the approximation distribution on a layer-by-layer basis by initially learning the neural networks corresponding to the latent variable of the first layer and recursively learning the neural networks corresponding to a latent variable of a deeper layer by one layer on the basis of a learning result. Thereby, an abstract concept is first acquired in a shallow layer and the concept can be gradually detailed as the layer becomes deeper.

<Configuration of Signal Change Apparatus According to Second Embodiment of Present Invention>

In the signal change apparatus 100 according to the second embodiment of the present invention, an input unit 10 receives a plurality of pieces of image data x as learning data. Moreover, the input unit 10 receives image data x that is a change target.

First, a learning unit 30 generates latent variables $z_1$, $z_2$, and $z_3$ representing identity and latent variables $c_1$, $c_2$, and $c_3$ representing each attribute in layers from given data distributions. Each latent variable represents, for example, the presence or absence or positive or negative of an attribute in each layer. However, latent variables are not particularly limited thereto. The learning unit 30 may generate the latent variables $z_1$, $z_2$, and $z_3$ representing identity and the latent variables $c_1$, $c_2$, and $c_3$ representing each attribute in respective layers using random numbers. The learning unit 30 receives true image data x included in the input learning data, the generated latent variables $z_1$, $z_2$, and $z_3$ representing identity, and the generated latent variables $c_1$, $c_2$, and $c_3$ representing each attribute in the respective layers. Then, the learning unit 30 learns a neural network (e.g., a CNN) serving as a generator for generating image data and a neural network (e.g., a CNN) serving as a discriminator for discriminating whether or not the generated image data follows the same distribution as the true image data from the latent variables $z_1$, $z_2$, and $z_3$ representing identity and the latent variables $c_1$, $c_2$, and $c_3$ representing each attribute in accordance with optimization conditions that contend with each other. At the same time, the learning unit 30 performs learning so that a lower limit of an amount of information is maximized with respect to a neural network (e.g., a CNN) serving as an approximation distribution for estimating a latent variable representing each attribute with respect to the generated image data. The learning unit 30 iteratively performs the above-described process recursively with respect to each layer.

Specifically, the learning unit 30 first receives the true image data x included in the learning data input with respect to the first layer, the generated latent variable $z_i$ representing identity, and the latent variable $c_1$ representing each attribute of the first layer.

Then, the learning unit 30 generates image data using the generated latent variable $z_i$ representing identity, the latent variable $c_1$ representing each attribute of the first layer, and the neural network $G_1$ serving as a generator.

Then, the learning unit 30 updates a parameter of the neural network $G_1$ serving as the generator so as to satisfy a constraint that the discriminator discriminates that the generated image data follows the same distribution as the true image data as much as possible. That is, the parameter of the neural network $G_1$ is updated so that the discriminator discriminates that the generated image data is the true image data x.

Moreover, the learning unit 30 updates a parameter of the neural network $D_1$ serving as the discriminator so as to satisfy a constraint that the discriminator discriminates that the generated image data does not follow the same distribution as the true image data x as much as possible and so as to satisfy a constraint that the discriminator discriminates that the true image data x follows the same distribution as the true image data.

Moreover, the learning unit 30 updates a parameter of the neural network $Q_1$ serving as the approximation distribution so that a lower limit of a correlation (information amount) between the latent variable $c_1$ and image data generated from the latent variable $c_1$ is maximized with respect to the neural network $Q_1$ serving as the approximation distribution for predicting the latent variable $c_1$ representing each attribute of the first layer with respect to the generated image data.

Next, the learning unit 30 receives the true image data x included in the learning data input with respect to the second layer, the latent variable $c_1$ representing each attribute of the first layer predicted by the neural network $Q_1$ serving as the approximation distribution, the generated latent variable $z_2$ representing identity, and the latent variable $c_2$ representing each attribute of the second layer. At this time, the latent variable $c_2'$ representing each attribute of the second layer is obtained by converting the latent variable $c_2$ representing each attribute of the second layer using the value of the latent variable $c_1$ representing each attribute of the first layer. As an example of conversion, it is conceivable that the latent variable $c_2$ representing each attribute of the second layer is multiplied by the latent variable $c_1$ representing each attribute of the first layer.

Moreover, the learning unit 30 generates image data using the generated latent variable $z_2$ representing identity, the conversion result $c_2'$ for the latent variable $c_2$ representing each attribute of the second layer, and the neural network $G_2$ serving as the generator.

Then, the learning unit 30 updates a parameter of the neural network $G_2$ serving as the generator so as to satisfy a constraint that the discriminator discriminates that the generated image data follows the same distribution as the true image data under the latent variable $c_1$ representing each attribute of the first layer as much as possible. That is, the parameter of the neural network $G_2$ is updated so that the discriminator discriminates that the generated image data is the true image data.

Moreover, the learning unit 30 updates a parameter of the neural network $D_2$ serving as the discriminator so as to satisfy a constraint that the discriminator discriminates that the generated image data does not follow the same distribution as the true image data under the latent variable $c_1$ representing each attribute of the first layer as much as possible and so as to satisfy a constraint that the discriminator discriminates that the true image data x follows the same distribution as the true image data.

Moreover, the learning unit 30 updates a parameter of the neural network $Q_2$ serving as the approximation distribution so that a lower limit of a correlation (information amount) between the latent variable $c_2'$ and image data generated from the latent variable $c_2'$ is maximized with respect to the neural network $Q_2$ serving as the approximation distribution for predicting the latent variable $c_2'$ representing each attribute of the second layer with respect to the generated image data under the latent variable $c_1$ representing each attribute of the first layer.

Next, the learning unit 30 receives the true image data x included in the learning data input with respect to the third layer, the latent variable $c_2'$ representing each attribute of the second layer predicted by the neural network $Q_2$ serving as the approximation distribution, the generated latent variable $z_3$ representing identity, and the latent variable $c_3$ representing each attribute of the third layer. At this time, the latent variable $c_3'$ representing each attribute of the third layer is obtained by converting the latent variable $c_3$ representing each attribute of the third layer using the value of the conversion result $c_2'$ for the latent variable $c_2$ representing each attribute of the second layer.

Moreover, the learning unit 30 generates image data using the generated latent variable $z_3$ representing identity, the conversion result $c_3'$ for the latent variable $c_3$ representing each attribute of the third layer, and the neural network $G_3$ serving as the generator.

Then, the learning unit 30 updates a parameter of the neural network $G_3$ serving as the generator so as to satisfy a constraint that the discriminator discriminates that the generated image data follows the same distribution as the true image data under the conversion result $c_2'$ for the latent variable $c_2$ representing each attribute of the second layer as much as possible. That is, the parameter of the neural network $G_3$ is updated so that the discriminator discriminates that the generated image data is the true image data.

Moreover, the learning unit 30 updates a parameter of the neural network $D_3$ serving as the discriminator so as to satisfy a constraint that the discriminator discriminates that the generated image data does not follow the same distribution as the true image data under the conversion result $c_2'$ for the latent variable $c_2$ representing each attribute of the second layer as much as possible and so as to satisfy a constraint that the discriminator discriminates that the true image data x follows the same distribution as the true image data.

Moreover the learning unit 30 updates a parameter of the neural network $Q_3$ serving as the approximation distribution so that a lower limit of a correlation (information amount) between the latent variable $c_3'$ and image data generated from the latent variable $c_3'$ is maximized with respect to the neural network $Q_3$ serving as the approximation distribution for predicting the latent variable $c_3'$ representing each attribute of the third layer with respect to the generated image data under the conversion result $c_2'$ for the latent variable $c_2$ representing each attribute of the second layer.

The learning unit 30 performs the above-described process for each piece of the learning data and iteratively updates the parameters of various types of neural networks.

The neural networks $G_1$, $G_2$, and $G_3$ serving as the generators, the neural networks $D_1$, $D_2$, and $D_3$ serving as the discriminators, and the neural networks $Q_1$, $Q_2$, and $Q_3$ serving as the approximation distributions which are finally obtained are stored in the neural network storage unit 40.

Next, the learning unit 30 receives image data x included in the input learning data, estimates the latent variables $z_1$, $z_2$, and $z_3$ representing identity using a neural network serving as an encoder, and extracts the latent variables $c_1$, $c_2'$, and $c_3'$ representing each attribute using the neural networks $Q_1$, $Q_2$, and $Q_3$ serving as the approximation distributions.

Moreover, the learning unit 30 receives the estimated latent variable $z_3$ representing identity and the extracted latent variable $c_3'$ representing each attribute, and generates image data using the neural network $G_3$ serving as the generator.

Moreover, the learning unit 30 updates a parameter of the neural network serving as an encoder so as to satisfy a constraint that the generated image data is the same as the original image data x.

The learning unit 30 performs the above-described process for each piece of the learning data and iteratively updates the parameter of the neural network serving as the encoder.

The neural network serving as the encoder that is finally obtained is stored in the neural network storage unit 40.

The prediction unit 50 inputs the image data of the change target received by the input unit 10 to the neural network $Q_1$ serving as the approximation distribution for predicting the latent variable $c_1$ representing each attribute of the first layer and predicts the latent variable $c_1$ representing each attribute of the first layer.

The prediction unit 50 outputs the latent variable $c_1$ representing each attribute of the first layer to the variable extraction unit 52.

The variable extraction unit 52 receives the input image data x of the change target, estimates latent variables $z_1$, $z_2$, and $z_3$ representing identity of the image data x of the change target using the neural network serving as an encoder stored in the neural network storage unit 40, and extracts latent variables $c_2'$ and $c_3'$ representing the attribute of the second and subsequent layers using the neural networks $Q_2$ and $Q_3$ serving as the approximation distributions. The variable extraction unit 52 outputs the latent variable $c_1$ predicted by the prediction unit 50 and the extracted latent variables $c_2'$ and $c_3'$ to the signal attribute value display unit 54.

The signal attribute value display unit 54 causes the output unit 90 to display the latent variables $c_1$, $c_2'$, and $c_3'$ representing each attribute of the image data x of the change target in a state in which an instruction for changing the values can be received. Specifically, the signal attribute value display unit 54 displays the values of the latent variables $c_1$, $c_2'$, and $c_3'$ in the attribute change screen 92 by means of radio buttons 94 or slide bars 96 indicating the values of the latent variables $c_1$, $c_2'$, and $c_3'$ representing each attribute in a state in which an instruction for changing the values of the latent variables $c_1$, $c_2'$, and $c_3'$ representing each attribute can be received.

Moreover, reference image data that are transfer sources of the attributes are displayed in the reference image display regions 98B of the attribute change screen 92 and radio buttons 94 for selecting the reference image data are displayed so as to correspond to the reference image display regions 98B.

The changed attribute value acquisition unit 56 acquires changed values of the latent variables $c_1$, $c_2'$, and $c_3'$ representing the attribute of the change target when the instruction for changing the values of the latent variables $c_1$, $c_2'$, and $c_3'$ representing the attribute of the change target (e.g., an operation on the radio button 94 or the slide bar 96 indicating the value of the latent variable $c_3'$ representing each attribute) is received in the attribute change screen 92. It is to be noted that when an instruction for changing the value of the latent variable $c_1$ representing an attribute is received, the values of the associated latent variables $c_2'$ and $c_3'$ representing the attribute are also changed. Moreover, when an instruction for changing the value of the latent variable $c_2'$ representing the attribute is received, the value of the associated latent variable $c_3'$ representing the attribute is also changed.

Moreover, when an operation on a radio button 94 for selecting reference image data is received in the attribute change screen 92, the prediction unit 58 first inputs the selected image data of the reference target to the neural network $Q_1$ serving as an approximation distribution for predicting the latent variable $c_1$ representing each attribute of the first layer and predicts the latent variable $c_1$ representing each attribute of the first layer. Moreover, the variable extraction unit 60 receives the selected image data x of the reference target, estimates latent variables $z_1$, $z_2$, and $z_3$ representing identity of the image data x of the reference target using the neural network serving as an encoder stored in the neural network storage unit 40, and extracts the latent variables $c_2'$ and $c_3'$ representing each attribute using the neural networks $Q_2$ and $Q_3$ serving as approximation distributions. Then, the changed attribute value acquisition unit 56 acquires the obtained latent variable $c_3'$ representing each attribute as the changed value of the latent variable $c_3'$ representing the attribute of the change target.

The change unit 62 changes the latent variable $c_3'$ representing the attribute of the change target by replacing the latent variable $c_3'$ representing the attribute of the change target acquired by the changed attribute value acquisition unit 56 among the latent variables $c_1$, $c_2'$, and $c_3'$ representing each attribute obtained by the prediction unit 50 and the variable extraction unit 52 with the changed value.

The signal generation unit 64 receives the latent variable $z_3$ representing identity estimated by the variable extraction unit 52 and the latent variable $c_3'$ representing each attribute after the change by the change unit 62 and generates image data using the neural network $G_3$ serving as the generator stored in the neural network storage unit 40.

It is to be noted that because the other configuration and operation of the signal change apparatus 100 according to the second embodiment are similar to those of the first embodiment, a description thereof will be omitted.

As described above, the signal change apparatus according to the second embodiment changes the value of the conversion result of the latent variable representing each attribute of the third layer in accordance with the change instruction, receives a latent variable representing identity extracted by the neural network serving as the encoder and the conversion result of the latent variable representing each attribute of the third layer after the change, and generates image data using the neural network as the generator. Thereby, it is possible to appropriately change image data.

It is to be noted that the present invention is not limited to the above-described embodiments and various modifications and applications can be made without departing from the gist of the present invention.

For example, in the above-described embodiments, the signal change apparatuses 100 are configured so as to include the learning unit 30 for performing learning of the neural networks. However, the present invention is not limited to such a configuration. For example, a learning apparatus including the learning unit 30 may be provided separately from the signal change apparatus and the signal change apparatus may be configured to include a prediction unit, a variable extraction unit, a signal output unit, a signal attribute value display unit, a changed attribute value acquisition unit, a change unit, a signal generation unit, and a changed signal output unit.

Moreover, the above-described embodiments describe examples in which the input signal is face image data. However, the input signal is not limited thereto and may be image data other than the face image data. For example, the input signal may be character image data. In this case, an attribute vector y represents the presence or absence of each of types of characters (e.g., a, b, c, . . . 1, 2, . . . ), and a latent variable $z_a$ representing the attribute represents the diversity within a character (e.g., representing "What type of character is 4?"). Alternatively, the attribute vector y represents the presence or absence of each of character fonts (e.g., a Gothic style, a Mincho style, a bold style, an italic style, and the like), and the latent variable $z_a$ representing the attribute represents the diversity within a font (e.g., representing "What Gothic style is it?").

Moreover, the input signal may be animal image data (e.g., bird image data). In this case, the attribute vector y represents the presence or absence of a color (e.g., red), and the latent variable $z_a$ representing the attribute represents the diversity within the color (e.g., representing "How red is the bird in what part?"). Alternatively, the attribute vector y represents the shape of a part (e.g., a bill is round/pointed) and the latent variable $z_a$ representing the attribute represents the diversity within the part (e.g., representing "How round is the bill?").

Moreover, the input signal may be background image data. In this case, the attribute vector y represents the type of background (e.g., a sea, a mountain, a river, a house, or a road), and the latent variable $z_a$ representing the attribute represents the diversity within the background (e.g., representing "What type of sea is it?").

Moreover, the input signal may be house image data. In this case, the attribute vector y represents the presence or absence of a color (e.g., red), and the latent variable $z_a$ representing the attribute represents the diversity within the color (e.g., representing "How red is the house in what part?").

Moreover, the input signal may be structure image data. In this case, the attribute vector y represents the presence or absence of the type of structure (e.g., a building, a detached house, or a tower), and the latent variable $z_a$ representing the attribute represents the diversity within the structure (e.g., representing "What type of building is it?"). Alternatively, the attribute vector y represents the presence or absence of the shape of a part (e.g., a roof is flat, a roof is round, or a roof is triangular) and the latent variable $z_a$ representing the attribute represents the diversity within the part (e.g., representing "How flat is the roof?).

Moreover, the above-described embodiments describe examples in which the input signal is image data. However, the input signal is not limited thereto and may be a signal other than image data. For example, the input signal may be an audio signal (or a music signal), text data, or moving-image data.

Figure 10:
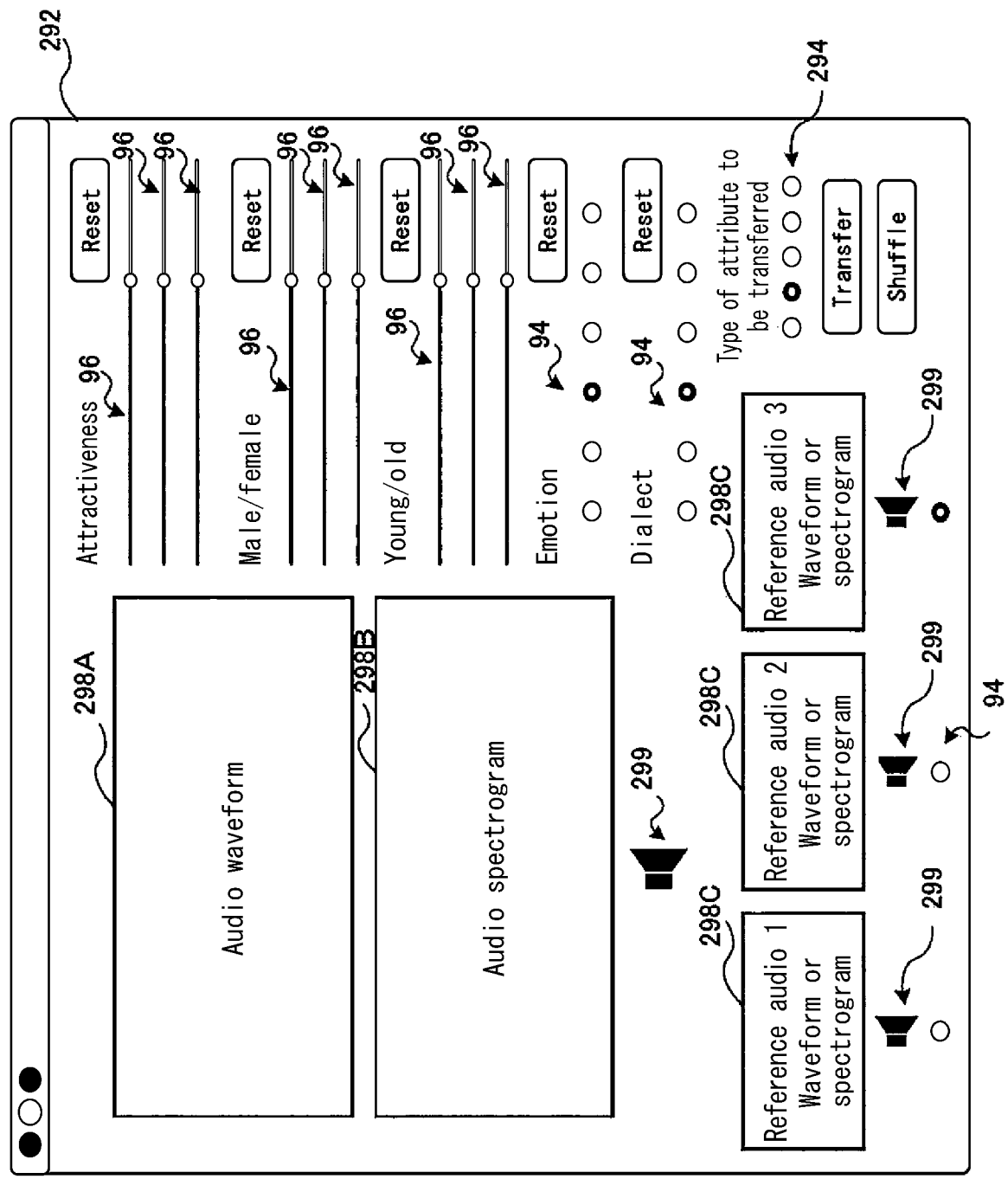
FIG. 10 is an imaginary diagram of an attribute change screen for changing an attribute of an audio signal.

When an audio signal is input, the signal change apparatus 100 can reconfigure the audio signal by changing a latent variable representing an attribute after extracting a latent variable representing identity and a latent variable representing an attribute (an attribute related to a person who is a generation source of the audio signal (e.g., attractiveness, male/female, young/old, an emotion, a dialect, or the like) or an attribute related to an element constituting the audio signal (e.g., fast/slow or high/low)). In this case, as shown in FIG. 10, the signal output unit 53 or the changed signal output unit 66 causes an audio waveform and an audio spectrogram of audio data of the change target or an audio waveform and an audio spectrogram of audio data after the change to be displayed in audio display regions 298A and 298B of an attribute change screen 292. Moreover, the signal attribute value display unit 54 displays the value of a latent variable $z_a'$ representing each attribute in the attribute change screen 292 by means of a radio button 94 or a slide bar 96 indicating the value of the latent variable $z_a'$ representing each attribute in a state in which an instruction for changing the value of the latent variable $z_a'$ representing each attribute can be received. Moreover, audio waveforms or spectrograms of reference audio signals that are transfer sources of the attributes are displayed in reference audio display regions 298C of the attribute change screen 292 and radio buttons 94 for selecting the reference audio signals are displayed so as to correspond to the reference audio display regions 298C. Moreover, radio buttons 294 for selecting attributes to be transferred from the reference audio signals that are transfer sources of the attributes are displayed on the attribute change screen 292. Moreover, buttons 299 for issuing an instruction for reproducing an audio signal of a change target, an audio signal after the change, or a reference audio signal are also displayed on the attribute change screen 292.

Figure 11:
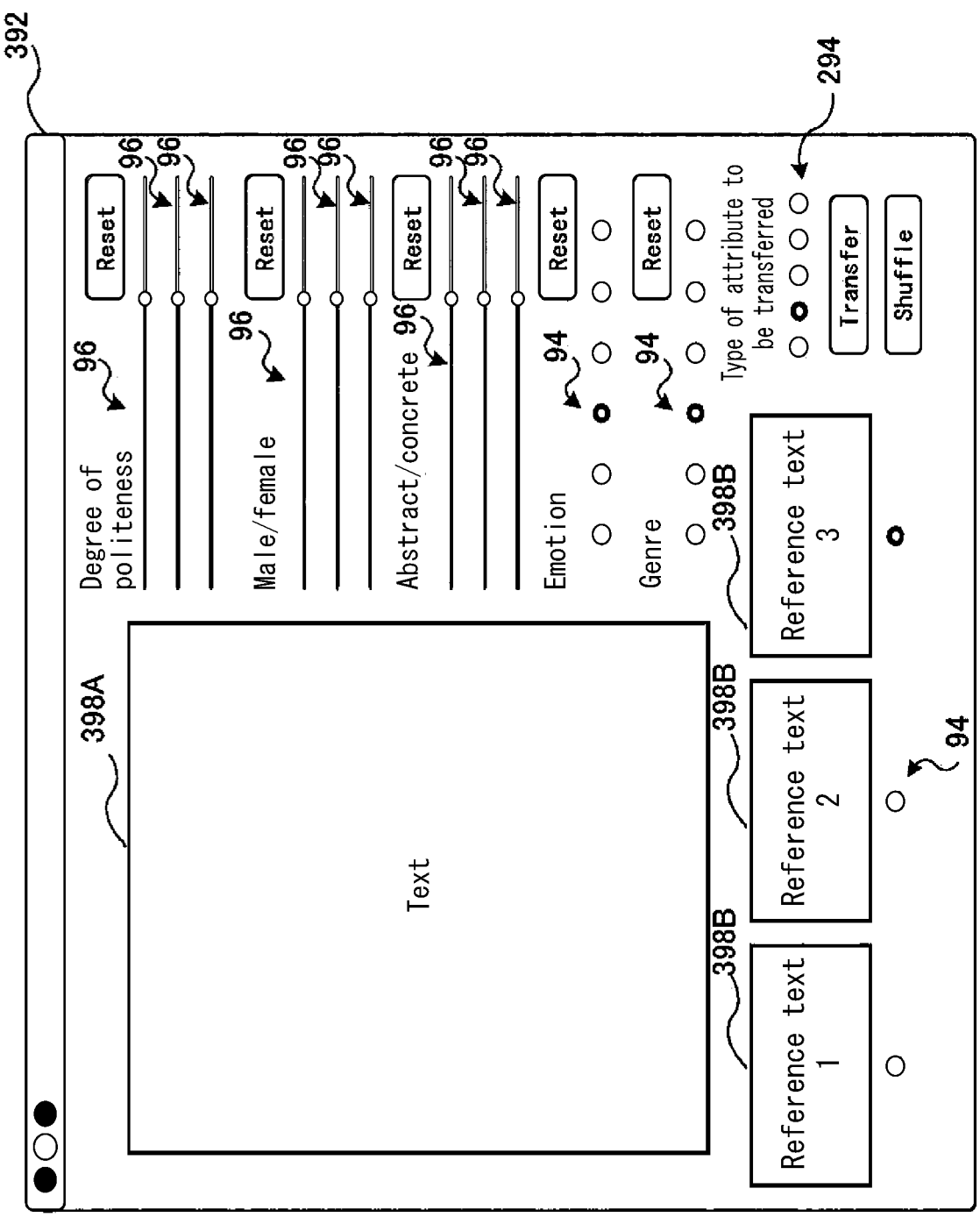
FIG. 11 is an imaginary diagram of an attribute change screen for changing an attribute of text data.

When text data is input, the signal change apparatus 100 can reconfigure the text data by changing a latent variable representing an attribute after extracting a latent variable representing identity and a latent variable representing an attribute (an attribute related to a person who is a generation source of the text data (e.g., the degree of politeness, male/female, or the like) or an attribute related to an element constituting the text data (e.g., abstract/concrete, an emotion, a genre, colloquial/literary, or formal/not formal)). In this case, as shown in FIG. 11, the signal output unit 53 or the changed signal output unit 66 causes text data of the change target or text data after the change to be displayed in a text display region 398A of an attribute change screen 392. Moreover, the signal attribute value display unit 54 displays the value of a latent variable $z_a'$ representing each attribute in the attribute change screen 392 by means of a radio button 94 or a slide bar 96 indicating the value of the latent variable $z_a'$ representing each attribute in a state in which an instruction for changing the value of the latent variable $z_a'$ representing each attribute can be received. Moreover, reference text data that are transfer sources of the attributes are displayed in reference text display regions 398B of the attribute change screen 392 and radio buttons 94 for selecting the reference text data are displayed so as to correspond to the reference text display regions 398B. Moreover, radio buttons 294 for selecting attributes to be transferred from the reference text data that are the transfer sources of the attributes are displayed on the attribute change screen 392.

Figure 12:
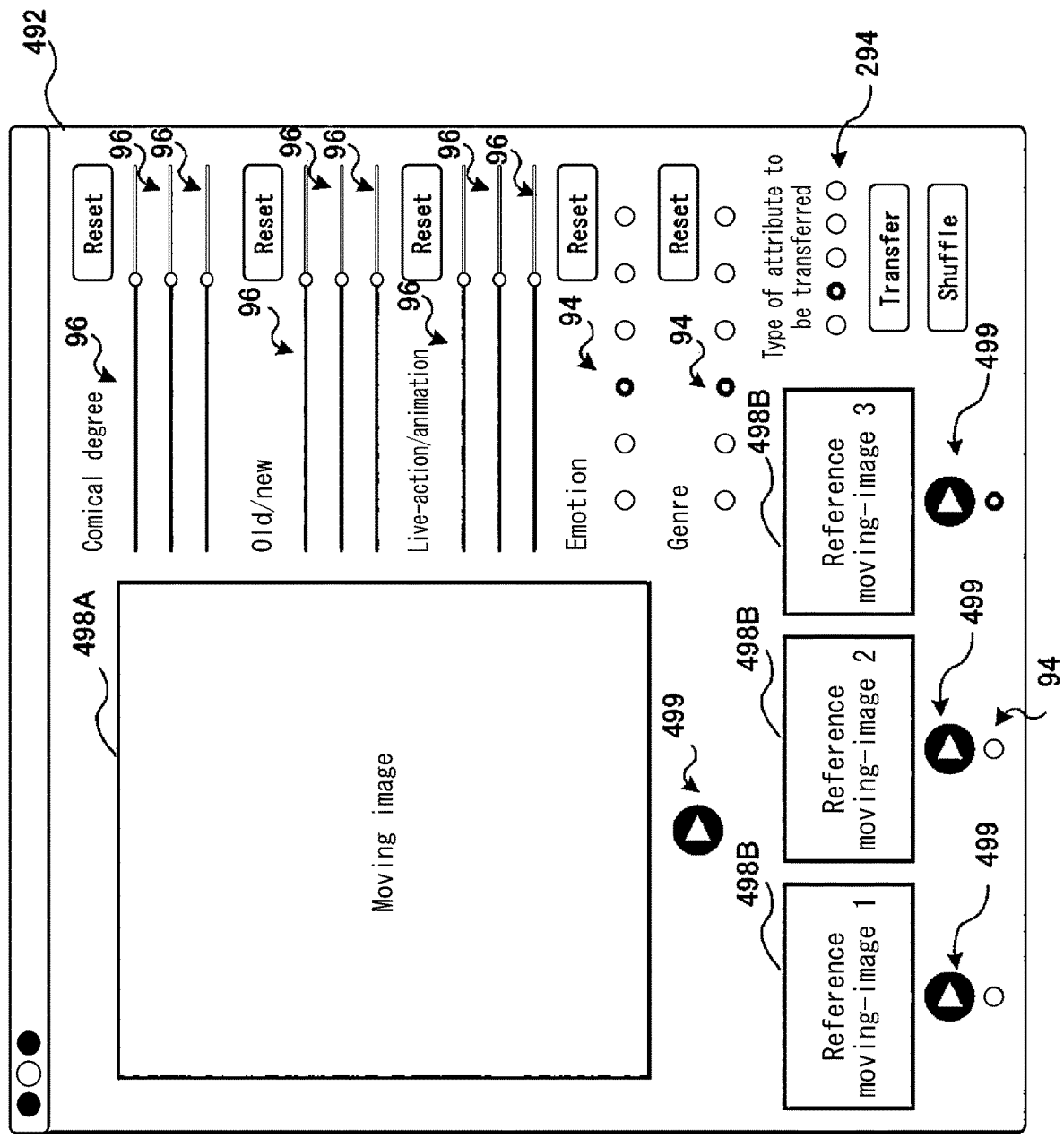
FIG. 12 is an imaginary diagram of an attribute change screen for changing an attribute of moving-image data.

When moving-image data is input, the signal change apparatus 100 can reconfigure the moving-image data by changing a latent variable representing an attribute after extracting a latent variable representing identity and a latent variable representing an attribute (an attribute related to an element constituting the moving-image data (e.g., a comical degree, old/new, live-action/animation, an emotion, a genre, or the like)). In this case, as shown in FIG. 12, the signal output unit 53 or the changed signal output unit 66 causes moving-image data of the change target or moving-image data after the change to be displayed in a moving-image display region 498A of an attribute change screen 492. Moreover, the signal attribute value display unit 54 displays the value of a latent variable $z_a'$ representing each attribute in the attribute change screen 492 by means of a radio button 94 or a slide bar 96 indicating the value of the latent variable $z_a'$ representing each attribute in a state in which an instruction for changing the value of the latent variable $z_a'$ representing each attribute can be received. Moreover, reference moving-image data that are transfer sources of the attributes are displayed in reference moving-image display regions 498B of the attribute change screen 492 and radio buttons 94 for selecting the reference moving-image data are displayed so as to correspond to the reference moving-image display regions 498B. Moreover, radio buttons 294 for selecting attributes to be transferred from the reference moving-image data that are the transfer sources of the attributes are displayed on the attribute change screen 492. Buttons 499 for issuing an instruction for reproducing moving-image data of a change target, moving-image data after the change, or reference moving-image data are also displayed in the attribute change screen 492.

It is to be noted that the above-described embodiments describe examples in which a latent variable representing each attribute is changed. However, the change target is not limited thereto. For example, an instruction for changing the value of a latent variable representing identity may be received, the latent variables representing each attribute may be maintained as it is, a latent variable representing identity extracted from image data may be changed, and the image data may be reconstructed.

Moreover, the reconstructed image data may be corrected in consideration of a reconstruction error when the image data is reconstructed. For example, a latent variable representing the attribute may be changed in accordance with the following formula, and image data $x_{mod}$ generated using the neural network serving as the generator may be corrected.

[Expression 11]

$$\tilde{x} = x_{rec} + M\Delta + (1-M)\Delta'$$

$$\Delta = x_{mod} - x_{rec},$$

$$\Delta' = x - x_{rec} \tag{7}$$

where $x_{rec}$ is image data reconstructed without changing a latent variable representing an attribute, x is image data of a change target, and M is a mask image obtained in advance in accordance with the following formula.

[Expression 12]

$$M = \min(\alpha \cdot g(|\overline{\Delta}|; \sigma), 1) \tag{8}$$

Here, Here, g represents a Gaussian distribution, σ represents the variance of the Gaussian distribution for $|\overline{\Delta}|$ [Expression 13]

which is an absolute value of an average of Δ with respect to RGB (red, green, blue), and a represents the spread of the Gaussian distribution.

Although an example in which the Gaussian distribution is used to calculate a mask image has been described, any distribution such as a Laplacian distribution may be used. Although an example in which the average value of the absolute values is used for calculating the norm of the difference image has been described, any norm such as an L2 norm may be used. The mask image may be calculated for each luminance value.

Moreover, the above-described embodiments describe examples in which CNNs are used as the neural networks serving as the discriminators, the generators, the predictors, and the approximation distributions. However, the structure of the neural networks is not limited thereto and other neural network structures may be used. For example, a recurrent neural network (RNN) (e.g., a long short-term memory (LSTM) or the like) which is a model that takes time series into consideration, a fully-connected neural network, or the like may be used.

Moreover, the above-described embodiments describe examples in which the latent variables themselves are output as the output of the neural network serving as the encoder. However, the output of the neural network serving as the encoder is not limited thereto. For example, the output of the neural network serving as the encoder may be a parameter related to the distribution of latent variables (e.g., an average and a standard deviation in the case of a Gaussian distribution) and the latent variables may be obtained by performing sampling in accordance with the parameter related to the distribution.

Moreover, the second embodiment describes an example in which the neural network serving as the encoder estimates the latent variables $z_1$, $z_2$ and $z_3$ representing identity, predicts the latent variables $c_2'$ and $c_3'$ representing attributes using the neural networks $Q_2$ and $Q_3$ serving as the approximation distributions, and predicts the latent variable $c_1$ using the neural network serving as the predictor. However, the neural network serving as the encoder may simultaneously estimate the latent variables $c_1$, $c_2$, and $c_3$ representing attributes and the latent variables $z_1$, $z_2$, and $z_3$ representing identity. Alternatively, the neural network serving as the encoder may directly estimate the latent variables $c_2'$ and $c_3'$ representing the attribute instead of the latent variables $c_2$ and $c_3$ representing the attribute.

Moreover, the optimum latent variables $z_1$, $z_2$, and $z_3$ representing identity may be obtained by inputting any latent variables $z_1$, $z_2$, and $z_3$ representing identity to the neural network serving as the generator and updating the latent variables $z_1$, $z_2$, and $z_3$ representing identity using a gradient method so that the output is close to a target image x without using the neural network serving as the encoder. Moreover, the optimum latent variables $z_1$, $z_2$, and $z_3$ representing identity may be obtained by obtaining the latent variable $c_1$ representing the attribute using the neural network serving as the predictor, obtaining the latent variables $c_2'$ and $c_3'$ representing the attribute and the latent variables $z_1$, $z_2$, and $z_3$ representing identity using the neural network serving as the encoder, setting the obtained latent variables as initial values, inputting the latent variables $z_1$, $z_2$, and $z_3$ representing identity to the neural network serving as the generator, and updating the latent variables $z_1$, $z_2$, and $z_3$ representing identity using a gradient method so that the output is close to a target image x.

Moreover, when the latent variables $c_2$ and $c_3$ representing the attribute are estimated simultaneously with the latent variables $z_1$, $z_2$, and $z_3$ representing identity using the neural network serving as the encoder, the neural network serving as the encoder obtains the latent variables $c_2'$ and $c_3'$ representing the attribute on the basis of the estimated latent variables $c_2$ and $c_3$ representing each attribute and the predicted latent variable $c_1$ representing each attribute of the first layer. The latent variable $c_3'$ representing each attribute is obtained as follows.

First, the latent variable $c_2'$ representing each attribute of the second layer is obtained by converting the latent variable $c_2$ representing each attribute of the second layer using the value of the latent variable $c_1$ representing each attribute of the first layer. Next, the latent variable $c_3'$ representing each attribute of the third layer is obtained by converting the latent variable $c_3$ representing each attribute of the third layer using the value of the conversion result $c_2'$ of the latent variable $c_2$ representing each attribute of the second layer.

Moreover, the neural network serving as the encoder or the neural network serving as the predictor may be learned together with the neural network serving as the generator and the neural network serving as the discriminator.

Moreover, the second embodiment describes an example in which the latent variable $c_1$ representing each attribute of the first layer is predicted from the image data included in the learning data and is used for learning. However, a method for obtaining the latent variable $c_1$ representing each attribute of the first layer is not limited thereto. For example, when learning is performed, a latent variable $c_1$ representing each attribute of the first layer may be input as learning data.

Moreover, in addition to the latent variable $c_1$ representing each attribute of the first layer, the latent variable representing each attribute of any layer may also be input as learning data to learn a deeper layer.

Moreover, the first embodiment describes an example in which the attribute vector y is assigned to all the pieces of the image data x included in the learning data. However, the image data x to which the attribute vector y is assigned is not limited thereto. For example, the attribute vector y may be assigned only to part of image data x included in learning data. Alternatively, the learning data may not include the attribute vector y. In this case, the signal change apparatus may estimate the attribute vector y as in the signal change apparatus of the second embodiment that estimates the latent variable $c_1$ representing each attribute corresponding to the attribute vector y. The signal change apparatus may learn each neural network on the basis of the estimated attribute vector y. Likewise, even in the case of the second embodiment, latent variables may be assigned only to part of image data x included in the learning data when latent variables representing each attribute of any layer are input as learning data.

A case in which the signal change apparatus of the second embodiment obtains a latent variable $c_i'$ by converting a latent variable $c_i$ using the value of a latent variable $c_{i-1}'$ representing each attribute of a layer directly before a current layer has been described. However, the signal change apparatus is not limited thereto and the latent variable $c_i'$ may be obtained by converting the latent variable $c_i$ using at least one of latent variables $c_j'$ (j=1, 2, ..., i–1) of a layer shallower than that corresponding to the latent variable $c_i'$. For example, when the latent variable $c_i'$ is obtained, the signal change apparatus may obtain the latent variable $c_i'$ by converting the latent variable $c_i$ using a latent variable $c_{i-2}'$ of a layer that is two layers shallower than that corresponding to the latent variable $c_i'$. Furthermore, the signal change apparatus may obtain the latent variable on the basis of a predetermined relationship between the latent variable $c_j'$ (j=1, 2, ..., i–1) of a layer shallower than that corresponding to the latent variables $c_i'$ and the latent variables $c_i'$.

In the generator 2 in the signal change apparatus of the first embodiment, a process of converting the latent variable $z_a$ using the attribute vector y may be performed by a neural network. The learning unit may perform learning of the neural network that converts the latent variable $z_a$ together with learning of the neural network G serving as the generator. In the generator 2 in the signal change apparatus of the second embodiment, a process of obtaining the latent variable $c_i'$ by converting the latent variable $c_i$ using the latent variable $c_{i-1}'$ may be performed by a neural network. The learning unit may perform learning of the neural network obtaining the latent variable $c_i'$ together with learning of the neural network $G_i$ serving as the generator.

A case in which the signal change apparatus in the first embodiment generates the latent variables $z_i$ and $z_a$ from a data distribution such as a categorical distribution or a uniform distribution has been described. However, a method for generating the latent variables $z_i$ and $z_a$ is not limited thereto. For example, the signal change apparatus may generate the latent variables $z_i$ and $z_a$ on the basis of any distribution including a Gaussian distribution, a Dirichlet distribution, or the like. Likewise, the signal change apparatus in the second embodiment may generate latent variables $z_1$, $z_2$, $z_3$, $c_1$, $c_2$, and $c_3$ on the basis of any distribution including a Gaussian distribution, a Dirichlet distribution, or the like. Alternatively, the signal change apparatuses in the first and second embodiments may be provided with a neural network for generating each of the latent variables.

A case in which the signal change apparatuses in the first and second embodiments use an objective function shown in Formula (5) as an optimization condition in learning of the neural network G serving as the generator and the neural network D serving as the discriminator has been described. However, the objective function representing the optimization condition in learning of the neural network G serving as the generator and the neural network D serving as the discriminator is not limited thereto. For example, the signal change apparatus may use any extended model including a least squares GAN, a Wasserstein GAN, and the like.

A case in which the neural network D serving as the discriminator in the first and second embodiments discriminates whether or not image data generated by the generator follows the same distribution as true image data under an attribute vector has been described. However, a target to be discriminated by the neural network D serving as the discriminator is not limited thereto. For example, the neural network D serving as the discriminator may discriminate whether or not generated image data follows the same distribution as the true image data. In this case, the result of discriminating whether or not the image data includes an attribute vector may be added to the objective function in learning of the neural network G serving as the generator and the neural network D serving as the discriminator. When the image data includes the attribute vector, this means that an attribute (a feature) indicated by the attribute vector is included in the image data. The discrimination of whether or not image data includes an attribute vector may be executed by, for example, a neural network $Q_l$ (l=1, 2, . . . , L) for estimating $P(c_1|x)$ and P (c|x, p) approximation distributions.

When the result of discriminating whether or not the image data includes the attribute vector is added to the objective function serving as the optimization condition, for example, the objective function is represented by Formula (9). In learning using the objective function represented by Formula (9), learning of the neural network G serving as the generator, the neural network D serving as the discriminator, and the neural network $Q_l$ (l=1, 2, . . . , L) for estimating the $P(c_1|x)$ and $P(c|x, p)$ approximation distributions is performed.

[Expression 14]

$$\min_{G}\max_{D} \min_{Q_1,\ldots,Q_L} \mathcal{L}_{GAN}(D, G) - \lambda_1 \mathcal{L}_{MI/AC}(G, Q_1) - \sum_{l=2}^{L} \lambda_l \mathcal{L}_{HCMI}(G, Q_l) \quad (9)$$

In Formula (9), $\lambda_1$, . . . , $\lambda_L$ are trade-off parameters. $L_{GAN}$(D, G) is represented by Formula (10-1). $L_{MI/AC}$(G, $Q_1$) represents that either $L_{MI}$(G, $Q_1$) represented by Formula (10-2) or $L_{AC}$(G, $Q_1$) represented by Formula (10-3) is used. When the learning data does not include an attribute vector, $L_{MI}$(G, $Q_1$) is used. When the learning data includes an attribute vector, $L_{AC}$(G, $Q_1$) is used. $L_{HCMI}$(G, $Q_1$) is represented by Formula (10-4).

[Expression 15]

$$\mathcal{L}_{GAN}(D,G)=\mathbb{E}_{x\sim P_{data}(x)}[\log D(x)]+\mathbb{E}_{z\sim P_z(z)}[\log(1-D(G(z)))] \quad (10\text{-}1)$$

$$\mathcal{L}_{MI}(G,Q_1)=\mathbb{E}_{c_1\sim P(c_1),x\sim G(\hat{c}_L^{\ z})}[\log Q_1(c_1|x)] \quad (10\text{-}2)$$

$$\mathcal{L}_{AC}(G,Q_1)=\mathbb{E}_{c_1\sim P(c_1),x\sim G(\hat{c}_L,z)}[\log Q_1(c_1|x)]+\mathbb{E}_{c_1,x\sim P_{data}(c_1,x)}[\log Q_1(c_1|x)] \quad (10\text{-}3)$$

$$\mathcal{L}_{HCMI}(G,Q_1)=\mathbb{E}_{c\sim P(c|p),x\sim G(\hat{c}_L^{\ z})}[\log Q_l(c|x,p)] \quad (10\text{-}4)$$

In Formulas (10-1) to (10-4), $x\sim P_{data}(x)$ represents that true image data x is sampled from learning data. $z\sim P(z)$ represents that a latent variable z ($z_i$ and $z_a$) is generated from a given data distribution. $c_1\sim P(c_1)$ represents that an attribute vector $c_1$ of a first layer is generated from a given data distribution. $x\sim G(\hat{c}_L, z)$ represents that image data is generated by the neural network G serving as the generator on the basis of a latent variable $\hat{c}_L$ representing each attribute in a layer L and a latent variable z ($z_i$ and $z_a$). $c_1, x\sim P_{data}(c_1, x)$ represents that true image data x and an attribute vector $c_1$ corresponding to the image data x are sampled from learning data. $c\sim P(c|p)$ represents that the latent variable c is sampled in accordance with a distribution $P(c|p)$. In Formula (10-4), c is a latent variable representing each attribute of an $l^{th}$ layer, and p is a latent variable representing each attribute of a $(l-1)^{th}$ layer.

Figure 13:
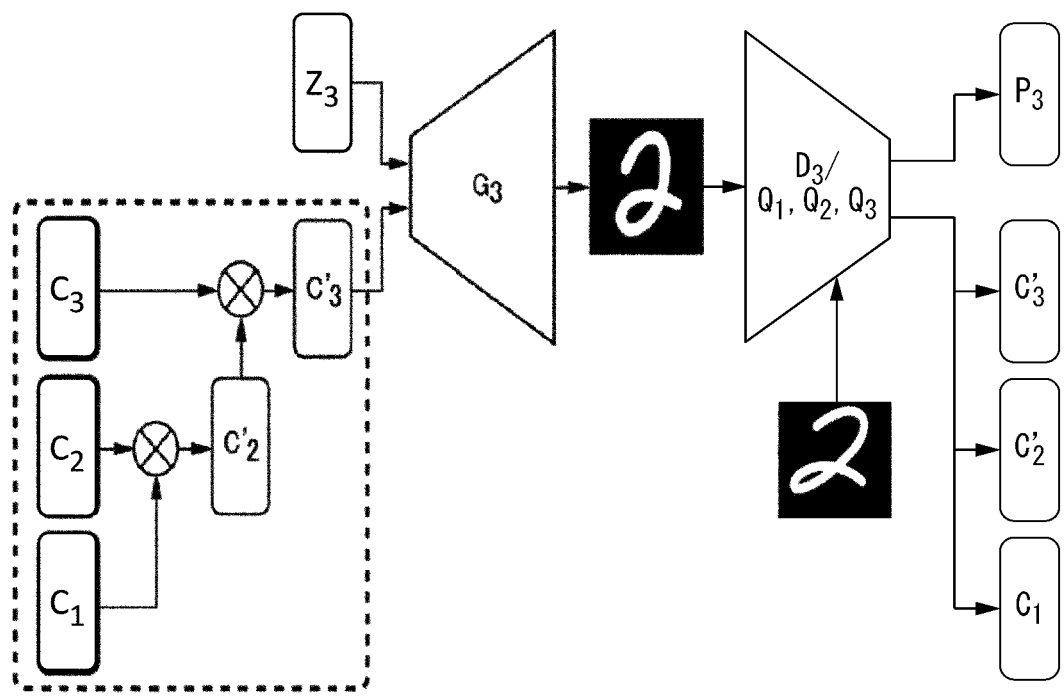
FIG. 13 is a conceptual diagram of a generator, a discriminator, and approximation distributions in the second embodiment of the present invention.

In the signal change apparatus of the second embodiment, when the discriminator discriminates whether or not the generated image data follows the same distribution as the true image data, the learning unit 30 may include a configuration having a single-layer neural network shown in FIG. 13 instead of the configuration having a three-layer neural network shown in FIG. 9. When the learning unit 30 includes the configuration of the single-layer neural network shown in FIG. 13, the learning unit 30 includes a neural network $G_3$ operating as a generator, a neural network $D_3$ operating as a discriminator, and neural networks $Q_1$, $Q_2$, and $Q_3$ for estimating distributions of latent variables $c_1$, $c_2'$, and $c_3'$ representing each attribute.

In learning of each neural network, the learning unit 30 fixes the parameters of other neural networks other than one neural network that is a learning target and updates a parameter of the neural network of the learning target. The learning of each of the neural networks provided in the learning unit 30 is iterated for each piece of learning data as in the learning described in the first and second embodiments.

When the neural network $Q_1$ is learned, the learning unit 30 updates a parameter of the neural network $Q_1$ on the basis of the latent variables $c_2$ and $c_3$ in which predetermined initial values are set and the latent variables $z_3$ and $c_1$ generated from a given data distribution. When the neural network $Q_2$ is learned, the learning unit 30 updates a parameter of the neural network $Q_2$ on the basis of the latent variable $c_3$ in which the initial value is set and the latent variables $z_3$, $c_1$, and $c_2$ generated from a given data distribution. When the neural network $Q_3$ is learned, the learning unit 30 updates a parameter of the neural network $Q_3$ on the basis of the latent variables $z_3$, $c_1$, $c_2$, and $c_3$ generated from a given data distribution.

The initial values to be set in the latent variables $c_2$ and $c_3$ representing the attribute are determined on the basis of, for example, expected values or average values of values capable of being taken by the latent variables $c_2$ and $c_3$. Alternatively, the initial values may be determined on the basis of the number of variables included in the latent variables $c_2$ and $c_3$. The learning of the neural networks $G_3$ and $D_3$ is similar to the learning described in the second embodiment.

The discrimination of whether or not image data includes an attribute vector may be performed by the neural network D serving as the discriminator. When the discriminator discriminates whether or not image data includes an attribute vector, the discriminator may further include a neural network that determines whether or not each attribute is included in the input image data.

The signal change apparatuses may apply known image processing technology to the generated image data. For example, the signal change apparatuses may perform super-resolution processing or correction of the image quality on the generated image.

The signal change apparatuses and the learning apparatuses in the above-described embodiments may be implemented by a computer. In this case, the signal change apparatuses and the learning apparatuses may be implemented by recording a program for implementing their functions on a computer-readable recording medium and causing a computer system to read and execute the program recorded on the recording medium. It is to be noted that the "computer system" described here is assumed to include an operating system (OS) and hardware such as peripheral devices. Moreover, the "computer-readable recording medium" refers to a portable medium such as a flexible disk, a magneto-optical disc, ROM, and a compact disc (CD)-ROM, and a storage apparatus such as a hard disk embedded in the computer system. Furthermore, the "computer-readable recording medium" may also include a computer-readable recording medium for dynamically holding a program for a short time as in a communication line when the program is transmitted via a network such as the Internet or a communication circuit such as a telephone circuit and a computer-readable recording medium for holding the program for a fixed time as in a volatile memory inside the computer system serving as a server or a client. Moreover, the program may be used to implement some of the above-described functions. The program may implement the above-described functions in combination with a program already recorded on the computer system. The program may be implemented using a programmable logic device such as a field programmable gate array (FPGA).

INDUSTRIAL APPLICABILITY

The present invention can be used to, for example, change a signal such as an image. According to the present invention, it is possible to appropriately change a signal.

DESCRIPTION OF REFERENCE SIGNS

1 Encoder
2 Generator
3 Discriminator
10 Input unit
20 Arithmetic unit
30 Learning unit
40 Neural network storage unit
50 Prediction unit
52 Variable extraction unit
53 Signal output unit
54 Signal attribute value display unit
56 Changed attribute value acquisition unit
58 Prediction unit
60 Variable extraction unit
62 Change unit
64 Signal generation unit
66 Changed signal output unit
90 Output unit
92 Attribute change screen
94 Radio button
96 Slide bar
98A Image display region
98B Reference image display region
100 Signal change apparatus
292 Attribute change screen
294 Radio button
298A, 298B Audio display region
298C Reference audio display region
299 Button
392 Attribute change screen
398A Text display region
398B Reference text display region
492 Attribute change screen
498A Moving-image display region
498B Reference moving-image display region
499 Button
E, D, G, $Q_1$, $Q_2$, $Q_3$ Neural network

The invention claimed is:

1. A signal change apparatus comprising:
a signal outputter that outputs an acquired signal;
a signal attribute value displayer that displays a value of an attribute related to an element constituting a target represented by the acquired signal or a signal generation source in a state in which a change instruction of the value of the attribute is able to be received;
a changed attribute value acquirer that acquires a changed value of the attribute when the change instruction of the value of the attribute is received;
a changer that changes the value of the attribute for which the change instruction has been received on the basis of the changed value of the attribute acquired by the changed attribute value acquirer;
a changed signal outputter that outputs a changed signal in which the value of the attribute has been changed; and
a variable extractor that extracts, from the acquired signal, a plurality of latent variables that include a first latent variable representing identity of the signal and a second latent variable that is independent of the first latent variable and that is a latent variable representing each attribute of the signal or a latent variable based on the latent variable, and acquires a third latent variable representing each attribute of the changed signal by converting the second latent variable using an attribute vector based on the acquired signal,
wherein the signal attribute value displayer outputs the third latent variable,
the changer changes a value of the third latent variable on the basis of the changed value of the attribute acquired by the changed attribute value acquirer,
the value of the third latent variable is constrained by a value of the attribute vector, and
each of the signal outputter, the signal attribute value displayer, the changed attribute value acquirer, the changer, the changed signal outputter, and the variable extractor is implemented by: i) computer executable instructions executed by at least one processor, ii) at least one circuit, or iii) a combination of the computer executable instructions and the at least one circuit.

2. The signal change apparatus according to claim 1, wherein each of the acquired signal and the changed signal is an image, and
the attribute is an attribute related to an element constituting a subject representing the image.

3. The signal change apparatus according to claim 1 or 2, wherein the signal attribute value displayer displays the value of the attribute by means of a controller indicating the value of the attribute in the state in which the change instruction of the value of the attribute is able to be received.

4. A signal change apparatus comprising:
a variable extractor that extracts, from an input signal, a plurality of latent variables that include a first latent variable representing identity of the input signal and a second latent variable that is independent of the first latent variable and that is a latent variable representing each attribute of the input signal or a latent variable based on the latent variable, and acquires a third latent variable representing each attribute of the input signal by converting the second latent variable using an attribute vector based on the input signal;
a changer that changes a value of the third latent variable acquired by the variable extractor by replacing the value of the acquired third latent variable with a value of a latent variable representing an attribute extracted from a signal of a transfer source; and
a signal generator that generates a signal from the third latent variable changed by the changer,
wherein the value of the third latent variable is constrained by a value of the attribute vector, and
each of the variable extractor, the changer, and the signal generator is implemented by: i) computer executable instructions executed by at least one processor, ii) at least one circuit, or iii) a combination of the computer executable instructions and the at least one circuit.

5. A signal change method comprising:
outputting, by a signal outputter, an acquired signal;
displaying, by a signal attribute value displayer, a value of an attribute related to an element constituting a target represented by the acquired signal or a signal generation source in a state in which a change instruction of the value of the attribute is able to be received;
acquiring, by a changed attribute value acquirer, a changed value of the attribute when the change instruction of the value of the attribute is received;
changing, by a changer, the value of the attribute for which the change instruction has been received on the basis of the changed value of the attribute acquired by the changed attribute value acquirer;
outputting, by a changed signal outputter, a changed signal in which the value of the attribute has been changed;
extracting, by a variable extractor, a plurality of latent variables that include a first latent variable representing identity of the signal and a second latent variable that is independent of the first latent variable and that is a latent variable representing each attribute of the signal or a latent variable based on the latent variable from the acquired signal, and acquiring, by the variable extractor, a third latent variable representing each attribute of the changed signal by converting the second latent variable using an attribute vector based on the acquired signal;
outputting, by the signal attribute value displayer, the third latent variable; and
changing, by the changer, a value of the third latent variable on the basis of the changed value of the attribute acquired by the changed attribute value acquirer,
wherein the value of the third latent variable is constrained by a value of the attribute vector.

6. A signal change method comprising:
extracting, by a variable extractor, a plurality of latent variables that include a first latent variable representing identity of an input signal and a second latent variable that is independent of the first latent variable and that is a latent variable representing each attribute of the input signal or a latent variable based on the latent variable from the input signal, and acquires a third latent variable representing each attribute of the input signal by converting the second latent variable using an attribute vector based on the input signal;
outputting, by a signal attribute value displayer, the third latent variable;
changing, by a changer, a value of the third latent variable acquired by the variable extractor on the basis of a changed value of the third latent variable acquired by a changed attribute value acquirer; and
generating, by a signal generator, a signal from the third latent variable changed by the changer,
wherein the value of the third latent variable is constrained by a value of the attribute vector.

7. A signal change method comprising:
extracting, by a variable extractor, a plurality of latent variables that include a first latent variable representing identity of an input signal and a second latent variable that is independent of the first latent variable and that is a latent variable representing each attribute of the input signal or a latent variable based on the latent variable from the input signal, and acquires a third latent variable representing each attribute of the input signal by converting the second latent variable using an attribute vector based on the input signal;
changing, by a changer, a value of the third latent variable acquired by the variable extractor by replacing the value of the acquired third latent variable with a value of a latent variable representing an attribute extracted from a signal of a transfer source; and
generating, by a signal generator, a signal from the third latent variable changed by the changer,
wherein the value of the third latent variable is constrained by a value of the attribute vector.

8. The signal change apparatus according to claim 1, wherein the changer performs replacement on the value of the third latent variable on the basis of the changed value of the attribute acquired by the changed attribute value acquirer,
the signal change apparatus further comprises a signal generator that generates the changed signal using the value of the third latent variable after the replacement, a value of the first latent variable, and at least one pre-learned neural network, and
the signal generator is implemented by: i) the computer executable instructions ii) the at least one circuit, or iii) the combination of the computer executable instructions and the at least one circuit.

9. A signal change apparatus comprising:
a signal outputter that outputs an acquired signal;
a signal attribute value displayer that displays a value of an attribute related to an element constituting a target represented by the acquired signal or a signal generation source in a state in which a change instruction of the value of the attribute is able to be received;
a changed attribute value acquirer that acquires a changed value of the attribute when the change instruction of the value of the attribute is received;
a changer that changes the value of the attribute for which the change instruction has been received on the basis of the changed value of the attribute acquired by the changed attribute value acquirer;
a changed signal outputter that outputs a changed signal in which the value of the attribute has been changed; and
a variable extractor that extracts, from the acquired signal, a plurality of latent variables that include a first latent variable representing identity of the signal and a second latent variable that is independent of the first latent variable and that is a latent variable representing each attribute of the signal or a latent variable based on the latent variable, and acquires a third latent variable representing each attribute of the changed signal by converting the second latent variable using an attribute vector based on the acquired signal,
wherein the signal attribute value displayer outputs the third latent variable,
the changer changes a value of the third latent variable by performing replacement on the value of the third latent variable on the basis of the changed value of the attribute acquired by the changed attribute value acquirer,
the signal change apparatus further comprises a signal generator that generates the changed signal using the value of the third latent variable after the replacement, a value of the first latent variable, and at least one pre-learned neural network,
the at least one neural network is generated by performing learning in accordance with an optimum condition that a first neural network serving as a generator that generates a signal and a second neural network serving as a discriminator that discriminates whether or not the signal generated by the generator follows the same distribution as a true signal contend with each other on the basis of the first latent variable representing the identity of the signal and the third latent variable that has been obtained by converting the second latent variable that is independent of the first latent variable and that is the latent variable representing each attribute of the signal or the latent variable based on the latent variable using the attribute vector, and each of the signal outputter, the signal attribute value displayer, the changed attribute value acquirer, the changer, the changed signal outputter, the variable extractor, and the signal generator is implemented by: i) computer executable instructions executed by at least one processor, ii) at least one circuit, or iii) a combination of the computer executable instructions and the at least one circuit.

10. A non-transitory computer-readable medium storing a program for causing a computer to function as the signal change apparatus according to claim 1.

11. A non-transitory computer-readable medium storing a program for causing a computer to function as the signal change apparatus according to claim 4.

* * * * *